US011120299B2

(12) United States Patent
Haigh et al.

(10) Patent No.: US 11,120,299 B2
(45) Date of Patent: Sep. 14, 2021

(54) INSTALLATION AND OPERATION OF DIFFERENT PROCESSES OF AN AI ENGINE ADAPTED TO DIFFERENT CONFIGURATIONS OF HARDWARE LOCATED ON-PREMISES AND IN HYBRID ENVIRONMENTS

(71) Applicant: Microsoft Technology Licensing, LLC, Redmond, WA (US)

(72) Inventors: Matthew Haigh, Seattle, WA (US); Chetan Desh, Bellevue, WA (US); Jett Jones, Seattle, WA (US); Shane Arney, Richmond, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 465 days.

(21) Appl. No.: 16/008,751

(22) Filed: Jun. 14, 2018

(65) Prior Publication Data

US 2018/0307945 A1 Oct. 25, 2018

Related U.S. Application Data

(63) Continuation-in-part of application No. 15/417,086, filed on Jan. 26, 2017, now Pat. No. 10,803,401.
(Continued)

(51) Int. Cl.
*G06F 9/50* (2006.01)
*G06N 20/00* (2019.01)
(Continued)

(52) U.S. Cl.
CPC ......... *G06K 9/6256* (2013.01); *G06F 9/5072* (2013.01); *G06K 9/6253* (2013.01);
(Continued)

(58) Field of Classification Search
CPC .... G06K 9/6256; G06K 9/6253; G06N 20/00; G06N 3/063; G06N 3/08; G06F 9/5072
See application file for complete search history.

(56) References Cited

U.S. PATENT DOCUMENTS 5,619,618 A 4/1997 Bigus
6,449,603 B1 9/2002 Hunter
(Continued)

FOREIGN PATENT DOCUMENTS

CN 101645083 A 2/2010
CN 102141991 A 8/2011
(Continued)

OTHER PUBLICATIONS

Luchian, Eduard, Cosmin Filip, Andrei Bogdan Rus, Iustin-Alexandru Ivanciu, and Virgil Dobrota. "Automation of the infrastructure and services for an OpenStack deployment using chef tool." In 2016 15th RoEduNet Conference: Networking in Education and Research, pp. 1-5. IEEE, 2016. (Year: 2016).*
(Continued)

*Primary Examiner* — Li B. Zhen
*Assistant Examiner* — Casey R. Garner
(74) *Attorney, Agent, or Firm* — Alleman Hall Creasman & Tuttle LLP

(57) ABSTRACT

An artificial intelligence ("AI") engine having multiple independent processes on one or more computing platforms is disclosed, where the one or more computing platforms are located on premises of an organization such that i) the one or more computing platforms are configurable for one or more users in the organization having at least administrative rights on the one or more computing platforms in order to configure hardware components thereof to execute and load the multiple independent processes of the AI engine; ii) the one or more users of the organization are able to physically
(Continued)

Figure 1A:
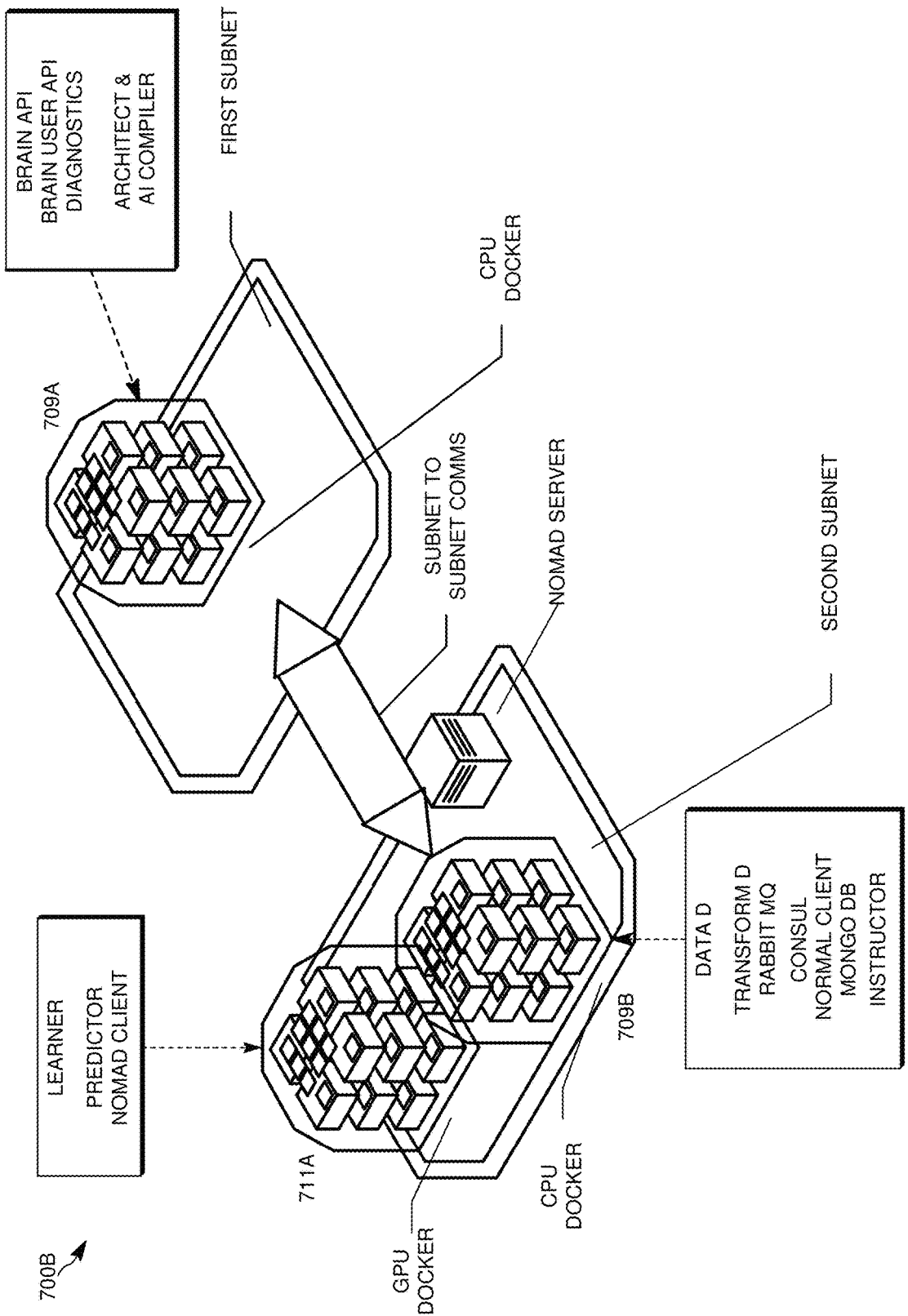

access the one or more computing platforms; and iii) the hardware components of the one or more computing platforms are connected to each other through a Local Area Network (LAN), and the LAN is configurable such that the one or more users in the organization have a right to control an operation of the LAN.

17 Claims, 12 Drawing Sheets

Related U.S. Application Data

(60) Provisional application No. 62/287,861, filed on Jan. 27, 2016, provisional application No. 62/524,381, filed on Jun. 23, 2017, provisional application No. 62/547,339, filed on Aug. 18, 2017.

(51) Int. Cl.
  *G06K 9/62* (2006.01)
  *G06N 3/063* (2006.01)
  *G06N 3/08* (2006.01)

(52) U.S. Cl.
  CPC ............... *G06N 3/063* (2013.01); *G06N 3/08* (2013.01); *G06N 20/00* (2019.01)

(56) References Cited

U.S. PATENT DOCUMENTS

| | | | |
|---|---|---|---|
| 7,386,522 B1 | 6/2008 | Bigus et al. | |
| 8,442,839 B2 | 5/2013 | Yen et al. | |
| 8,521,664 B1 | 8/2013 | Lin et al. | |
| 9,443,192 B1 | 9/2016 | Cosic | |
| 9,460,088 B1 | 10/2016 | Sak et al. | |
| 9,524,461 B1 | 12/2016 | Huynh | |
| 9,558,454 B2 | 1/2017 | Strassner | |
| 10,586,173 B2 | 3/2020 | Hammond et al. | |
| 10,800,040 B1* | 10/2020 | Beckman | B25J 9/163 |
| 10,990,894 B2 | 4/2021 | Shaashua et al. | |
| 2003/0004672 A1 | 1/2003 | Thurman | |
| 2003/0204311 A1 | 10/2003 | Bush | |
| 2004/0122788 A1 | 6/2004 | Griffith et al. | |
| 2004/0255291 A1* | 12/2004 | Sierer | G06F 8/61 717/174 |
| 2005/0034109 A1 | 2/2005 | Hamilton et al. | |
| 2005/0114280 A1 | 5/2005 | Rising, III | |
| 2005/0132032 A1 | 6/2005 | Bertrand | |
| 2005/0197991 A1 | 9/2005 | Wray et al. | |
| 2006/0166174 A1 | 7/2006 | Rowe et al. | |
| 2006/0218107 A1 | 9/2006 | Young | |
| 2009/0106165 A1 | 4/2009 | Solomon | |
| 2009/0106178 A1 | 4/2009 | Chu | |
| 2009/0119587 A1 | 5/2009 | Allen et al. | |
| 2009/0204563 A1 | 8/2009 | Gerber et al. | |
| 2010/0088258 A1 | 4/2010 | Oaten et al. | |
| 2010/0094790 A1 | 4/2010 | Gnojewski | |
| 2010/0106714 A1 | 4/2010 | Lim et al. | |
| 2012/0159090 A1 | 6/2012 | Andrews et al. | |
| 2012/0209794 A1 | 8/2012 | Jones, III | |
| 2012/0239598 A1 | 9/2012 | Cascaval et al. | |
| 2015/0066929 A1 | 3/2015 | Satzke et al. | |
| 2015/0339570 A1 | 11/2015 | Scheffler | |
| 2016/0034809 A1* | 2/2016 | Trenholm | G06F 8/35 706/20 |
| 2016/0283202 A1 | 9/2016 | Sellers-blais | |
| 2016/0358098 A1* | 12/2016 | Duesterwald | G06N 20/20 |
| 2017/0061283 A1 | 3/2017 | Rasmussen et al. | |
| 2017/0091670 A1 | 3/2017 | Gulin et al. | |
| 2017/0193361 A1 | 7/2017 | Chilimbi et al. | |
| 2017/0213126 A1 | 7/2017 | Hammond et al. | |
| 2017/0213128 A1 | 7/2017 | Hammond et al. | |
| 2017/0213131 A1 | 7/2017 | Hammond et al. | |
| 2017/0213132 A1 | 7/2017 | Hammond et al. | |
| 2017/0213154 A1 | 7/2017 | Hammond et al. | |
| 2017/0213155 A1 | 7/2017 | Hammond et al. | |
| 2017/0213156 A1 | 7/2017 | Hammond et al. | |
| 2017/0262769 A1* | 9/2017 | McShane | G06F 9/54 |
| 2017/0308800 A1 | 10/2017 | Cichon et al. | |
| 2018/0060759 A1* | 3/2018 | Chu | G06N 20/00 |
| 2018/0191867 A1* | 7/2018 | Siebel | H04L 67/12 |
| 2018/0240062 A1* | 8/2018 | Crabtree | G06Q 10/063112 |
| 2018/0293463 A1 | 10/2018 | Brown | |
| 2018/0293493 A1 | 10/2018 | Kalamkar et al. | |
| 2018/0293498 A1 | 10/2018 | Campos et al. | |
| 2018/0293517 A1 | 10/2018 | Browne et al. | |
| 2018/0357047 A1 | 12/2018 | Brown et al. | |
| 2018/0357152 A1 | 12/2018 | Browne et al. | |
| 2018/0357543 A1 | 12/2018 | Brown et al. | |
| 2018/0357552 A1 | 12/2018 | Campos et al. | |
| 2020/0250583 A1 | 8/2020 | Hammond et al. | |

FOREIGN PATENT DOCUMENTS

| | | |
|---|---|---|
| CN | 102222005 A | 10/2011 |
| CN | 102591654 A | 7/2012 |
| CN | 102707982 A | 10/2012 |
| CN | 104106276 A | 10/2014 |
| CN | 105068661 A | 11/2015 |
| WO | 2015017706 A2 | 2/2015 |

OTHER PUBLICATIONS

"Non-Final Office Action Issued in U.S. Appl. No. 15/416,970", dated Aug. 4, 2020, 7 Pages.
"Office Action Issued in European Patent Application No. 17745016.0", dated Jul. 13, 2020, 9 Pages.
Lirov, Yuval., "Computer Aided Neural Network Engineering", In the Journal of Neural Networks, vol. 5, Issue 1, Jul. 1992, pp. 711-719.
Perera, et al., "ANNEbot: An Evolutionary Artificial Neural Network Framework", I the Proceedings of 4th International Conference on Intelligent and Advanced Systems, Jun. 12, 2012, pp. 40-45.
"Build, Ship, Run Any App, Anywhere", Retrieved From: https://web.archive.org/web/20170120165452/https://www.docker.com/, Retrieved on: Jan. 20, 2017, 7 Pages.
"Services Overview", Published by Bonsai AI, Inc, 3 Pages.
"What's the Difference Between An Application, Process, and Services?", Retrieved From: https://superuser.com/questions/209654/whats-the-difference-between-an-application-process-and-services, Retrieved On: Jan. 20, 2017, 1 Page.
Chung, Kiuk, "Generating Recommendations At Amazon Scale With Apache Spark and Amazon DSSTNE", Retrieved From: https://aws.amazon.com/blogs/big-data/generating-recommendations-at-amazon-scale-with-apache-spark-and-amazon-dsstne/, Jul. 9, 2016, 8 Pages.
Dunn, Jeffrey, "Introducing FBLearner Flow: Facebook's AI Backbone", Retrieved From: https://web.archive.org/web/20180717150507/https://code.fb.com/core-data/introducing-fbleamer-flow-facebooks-ai-backbone/, May 9, 2016, 9 Pages.
Gray, Kathryn E.., "Toward Customizable Pedagogic Programming Languages", A dissertation submitted to the faculty of The University of Utah in partial fulfillment of the requirements for the degree of Doctor of Philosophy in Computer Science, Aug. 2006, 156 Pages.
Hammond, et al., "AIfor Everyone: An Introduction to Bonsai Brain and Inkling", In Bonsai AI, Inc. Whitepaper, Jan. 2016, 16 Pages.
He, Jinru, "Auto Scaling Pinterest", Retrieved From: https://web.archive.org/web/20161114182239/https://engineering.pinterest.com/blog/auto-scaling-pinterest, Sep. 16, 2016, 8 Pages.
Ma, Kevin, "Applying Deep Learning to Related Pins", Retrieved From: https://web.archive.org/web/20170214195127/https://engineering.pinterest.com/blog/applying-deep-learning-related-pins, Jan. 12, 2017, 6 Pages.
"International Search Report and Written Opinion Issued in PCT Application No. PCT/US2017/015446", dated Apr. 10, 2017, 6 Pages.

(56) References Cited

OTHER PUBLICATIONS

"International Search Report and Written Opinion Issued in PCT Application No. PCT/US2017/015460", dated May 5, 2017, 11 Pages.

"International Search Report and Written Opinion Issued in PCT Application No. PCT/US2017/015470", dated Apr. 21, 2017, 11 Pages.

Raschka, Sebastian, "Fitting A Model Via Closed-Form Equations Vs. Gradient Descent Vs Stochastic Gradient Descent Vs Mini-Batch Learning. What Is the Difference?", Retrieved From: https://sebastianraschka.com/faq/docs/closed-form-vs-gd.html, Retrieved From: Jan. 17, 2017, 6 Pages.

Tessler, et al., "A Deep Hierarchical Approach to Lifelong Learning in Minecraft", Retrieved From: https://arxiv.org/pdf/1604.07255.pdf, Nov. 30, 2016, 10 Pages.

Hengst, Bernhard, "Safe State Abstraction and Reusable Continuing Subtasks in Hierarchical Reinforcement Learning", In Proceedings of 20th Joint Conference on Artificial Intelligence, Dec. 2, 2007, 11 Pages.

"International Search Report & Written Opinion Issued in PCT Application No. PCT/US2018/037650", dated Aug. 31, 2018, 10 Pages.

"Non-Final Office Action Issued in U.S. Appl. No. 15/416,904", dated Aug. 14, 2019, 11 Pages.

"Notice of Allowance Issued in U.S. Appl. No. 15/417,075", dated Aug. 14, 2019, 9 Pages.

"Extended Search Report Issued in European Patent Application No. 17745025.1", dated Aug. 23, 2019, 9 Pages.

"Extended Search Report Issued in European Patent Application No. 17745016.0", dated Aug. 20, 2019, 8 Pages.

"Extended Search Report Issued in European Patent Application No. 17745030.1", dated Sep. 2, 2019, 7 Pages.

Campos, et al., "Concept Network Reinforcement Learning for Flexible Dexterous Manipulation", Retrieved From: https://medium.com/@BonsaiAI/concept-network-reinforcement-learning-for-flexible-dexterous-manipulation-47bf459b19b9, Sep. 19, 2017, 11 Pages.

Gudimella, et al., "Deep Reinforcement Learning for Dexterous Manipulation With Concept Networks", Retrieved From: https://arxiv.org/pdf/1709.06977.pdf, Sep. 20, 2017, 16 Pages.

"Non Final Office Action Issued in U.S. Appl. No. 15/416,988", dated Oct. 3, 2019, 11 Pages.

"Non Final Office Action Issued in U.S. Appl. No. 15/417,056", dated Oct. 17, 2019, 10 Pages.

"Non Final Office Action Issued in U.S. Appl. No. 15/417,086", dated Nov. 7, 2019, 13 Pages.

Beale, et al., "Neural Network Toolbox 7", Retrieved from http://citeseerx.ist.psu.edu/viewdoc/download?doi=10.1.1.220.1640&rep=rep1&type=pdf, 2010, 951 pages.

"Non Final Office Action Issued in U.S. Appl. No. 15/416,970", dated Nov. 21, 2019, 12 Pages.

"Non Final Office Action Issued in U.S. Appl. No. 15/417,033", dated Nov. 26, 2019, 13 Pages.

"Final Office Action Issued in U.S. Appl. No. 15/416,970", dated Mar. 3, 2020, 7 Pages.

"Final Office Action Issued in U.S. Appl. No. 15/417,086", dated Feb. 25, 2020, 18 Pages.

"Non Final Office Action Issued in U.S. Appl. No. 16/009,039", dated Dec. 14, 2020, 32 Pages.

"Summons to attend oral proceedings Issued in European Patent Application No. 17745016.0", dated Oct. 23, 2020, 7 Pages.

Ciancio et al., "Heuristic techniques to optimize neural network architecture in manufacturing applications", In Journal of Neural Computing and Applications vol. 27, Issue 7, Jul. 31, 2015, pp. 2001-2015.

"Office Action and Search Report Issued in Chinese Patent Application No. 201780020322.4", dated Apr. 2, 2021, 7 Pages.

Arendt, et al., "A tool environment for quality assurance based on the Eclipse Modeling Framework", In Journal of Automated Software Engineering, vol. 20, Issue 2, Dec. 11, 2012, pp. 141-184.

Yang, et al., "Intelligent Search Engine Based on Knowledge Library", In Journal of Computer and Information Technology, vol. 18, Issue 2, Apr. 30, 2010, pp. 41-44.

"First Office Action and Search Report Issued in Chinese Patent Application No. 201780020323 9", dated May 24, 2021, 21 Pages.

"Notice of Allowance Issued in U.S. Appl. No. 16/009,153", dated Jul. 1, 2021, 11 Pages.

\* cited by examiner

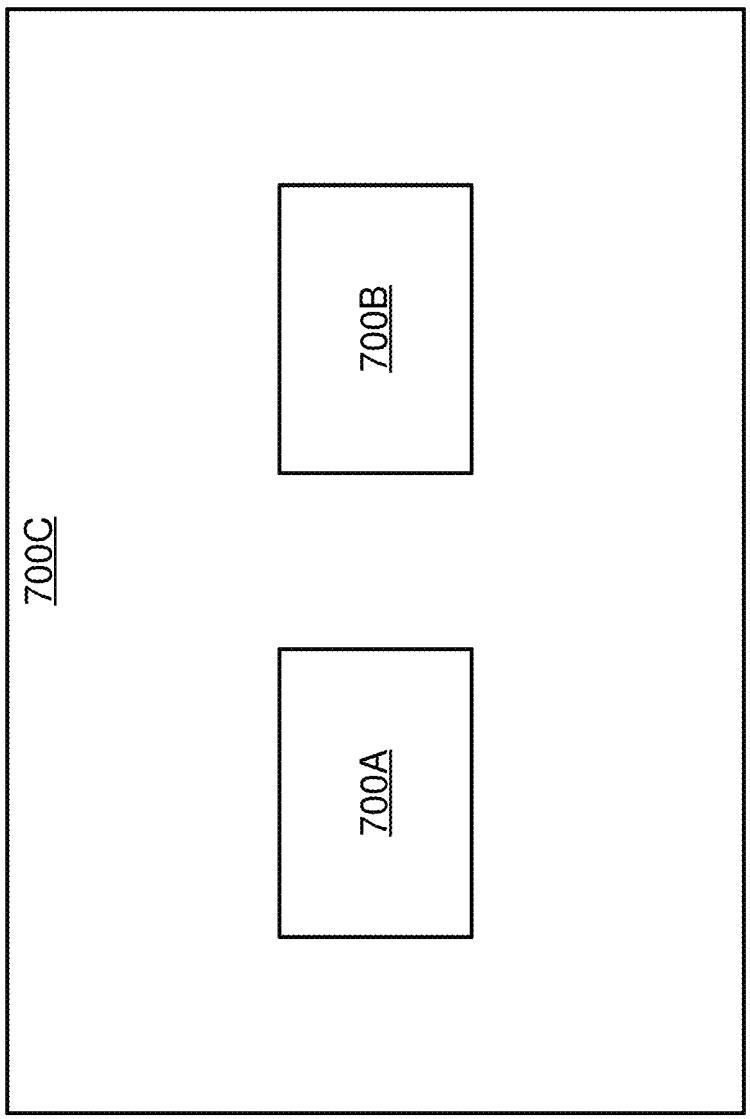

INSTALLATION AND OPERATION OF DIFFERENT PROCESSES OF AN AI ENGINE ADAPTED TO DIFFERENT CONFIGURATIONS OF HARDWARE LOCATED ON-PREMISES AND IN HYBRID ENVIRONMENTS

CROSS REFERENCE

This application is a continuation-in-part of U.S. patent application Ser. No. 15/417,086, titled "An artificial intelligence engine having multiple independent processes on a cloud-based platform configured to scale," filed Jan. 26, 2017, which claims the benefit of U.S. Provisional Application No. 62/287,861, filed Jan. 27, 2016, titled "Bonsai platform, language, and tooling," each of which is incorporated herein by reference in its entirety. This application also claims the benefit under 35 USC 119 of U.S. Provisional Application No. 62/524,381, titled "Systems and methods for extending functionality of trained machine-learning models, filed Jun. 23, 2017, and U.S. Provisional Application No. 62/547,339 titled "An artificial intelligence engine having multiple improvements," filed Aug. 18, 2017, each of which is incorporated herein by reference in its entirety.

NOTICE OF COPYRIGHT

A portion of the disclosure of this patent application contains material that is subject to copyright protection. The copyright owner has no objection to the facsimile reproduction by anyone of the material subject to copyright protection as it appears in the United States Patent & Trademark Office's records for this application, but otherwise reserves all copyright rights whatsoever.

FIELD

Embodiments of the design provided herein generally relate to artificial intelligence ("AI") systems having multiple independent processes on one or more computing platforms.

BACKGROUND

An engineer may need to attempt hundreds of experiments before finding a successful new feature or set of hyper parameters. Traditional pipeline systems do not provide a way to rerun pipelines with different inputs, mechanisms to explicitly capture outputs and/or side effects, and visualization of outputs. Additionally, training artificial intelligence models can take days or even weeks. Sometimes multiple training sessions on an artificial intelligence engine may be desired while also being able to create new AI models and/or while utilizing trained AI models.

SUMMARY

Provided herein are an embodiment on an AI engine hosted on a platform.

In an embodiment, an apparatus is provided including an Artificial Intelligence ("AI") engine having multiple independent processes on one or more computing platforms. The AI engine has a user interface for one or more users in a user's organization. The multiple independent processes are configured to have their instructions executed by one or more processors in the one or more computing platforms. The multiple independent processes are configured to be loaded into one or more memories of the one or more computing platforms. The one or more computing platforms are located on-premises of the user's organization, which means: i) The one or more computing platforms are configurable for the one or more users in the user's organization to have at least administrative rights over the one or more computing platforms. This enables the user's organization to configure hardware components of the one or more computing platforms to operate how the user's organization chooses to fit their needs to execute and load the multiple independent processes. ii) The one or more users of the user's organization are able to physically access the one or more computing platforms. iii) The hardware components of the one or more computing platforms are connected to each other through a Local Area Network (LAN), and the LAN is configurable such that the one or more users in the user's organization have a right to control an operation of the LAN. The multiple independent processes are configured as a set of independent processes, each independent process thereof wrapped in its own software container so that multiple instances of a same independent process can run simultaneously to scale to handle actions selected from a group consisting of 1) running multiple training sessions on two or more AI models at a same time, 2) creating the two or more AI models at a same time, 3) running a training session on one or more of AI models while creating the one or more AI models at the same time, and 4) any combination of these three, on the same AI engine. A first service of the multiple independent processes is configured to handle scaling by dynamically calling in additional computing devices to load on and run additional instances of each independent process wrapped in its own container as needed. The multiple independent processes improve an efficiency of the one or more computing platforms hosting the AI engine by scaling over an amount of available computing platforms.

In an embodiment, each independent process of the set of independent processes is wrapped in its own software container. This includes at least an instructor process and a learner process. The instructor process is configured to carry out a training plan codified in a pedagogical software programming language. The learner process is configured to carry out an actual execution of underlying AI learning algorithms during a training session. The instructor process and the learner process of the set of independent processes cooperate with one or more data sources to train a new AI model.

Also provided herein is a method of installing the multiple independent processes, each wrapped in its own container, onto one or more computing platforms. The one or more computing platforms are located on-premises of a user's organization. The method includes determining a number of virtual machines, physical machines, or both physical and virtual machines available in a cluster of the one or more computing platforms located on-premises for creating and training Artificial Intelligence ("AI") models with the one or more computing platforms. The method further includes allocating network addresses to the machines and copying scripts to the machines for the multiple independent processes. The method further includes running a first script configured to install the multiple independent processes on the machines for the multiple independent processes. Additionally, the method further includes allocating one or more roles to every machine or node thereof in the cluster, the roles for constraining microservices or independent process to certain types of nodes.

Any software implemented in the AI engine can be stored in one or more non-transitory machine-readable mediums in an executable format, which can be executed by the one or more processors.

These and other features of the design provided herein can be better understood with reference to the drawings, description, and claims, all of which form the disclosure of this patent application.

DRAWINGS

The drawings refer to an embodiment of the design provided herein in which:

FIG. 1A provides a block diagram illustrating an AI system and its on-premises based computing platforms infrastructure in accordance with an embodiment.

Figure 1B:
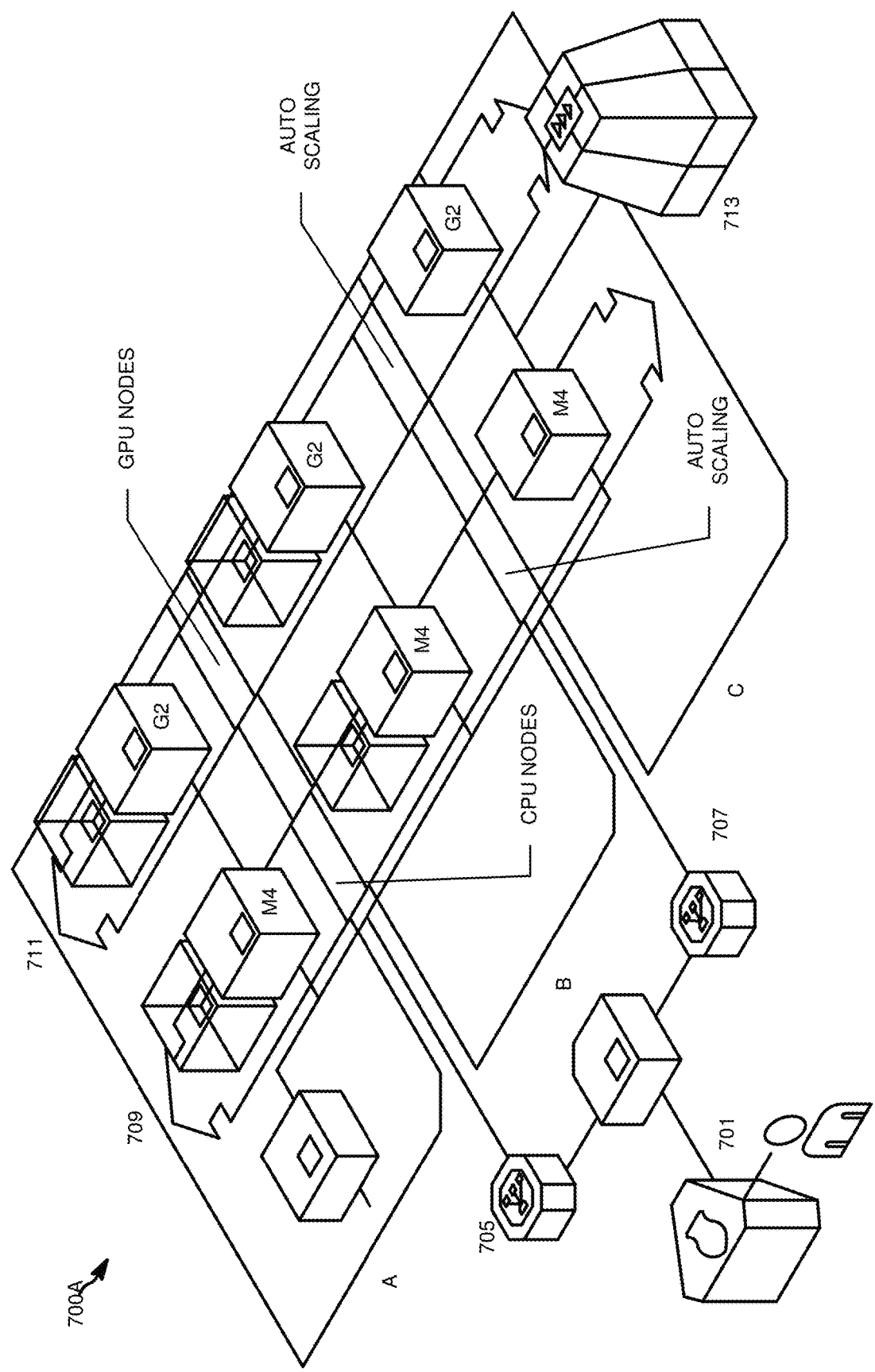

FIG. 1B provides a block diagram illustrating an AI system and its cloud-based computing platforms infrastructure in accordance with an embodiment.

FIG. 1C provides a block diagram illustrating an AI system in a hybrid platform in accordance with an embodiment.

Figure 2:
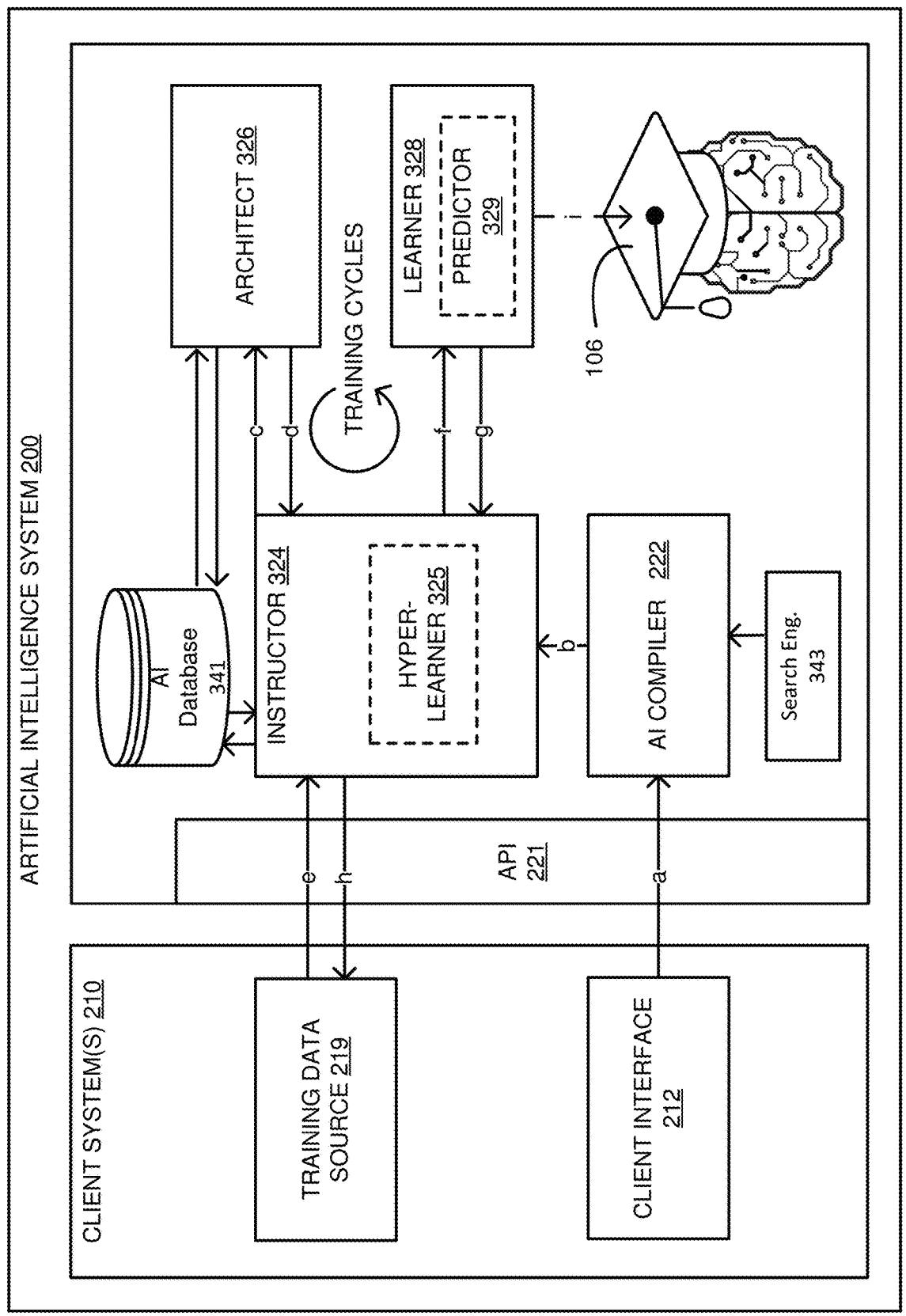

FIG. 2 provides a block diagram illustrating an AI engine with multiple independent processes in accordance with an embodiment.

Figure 3A:
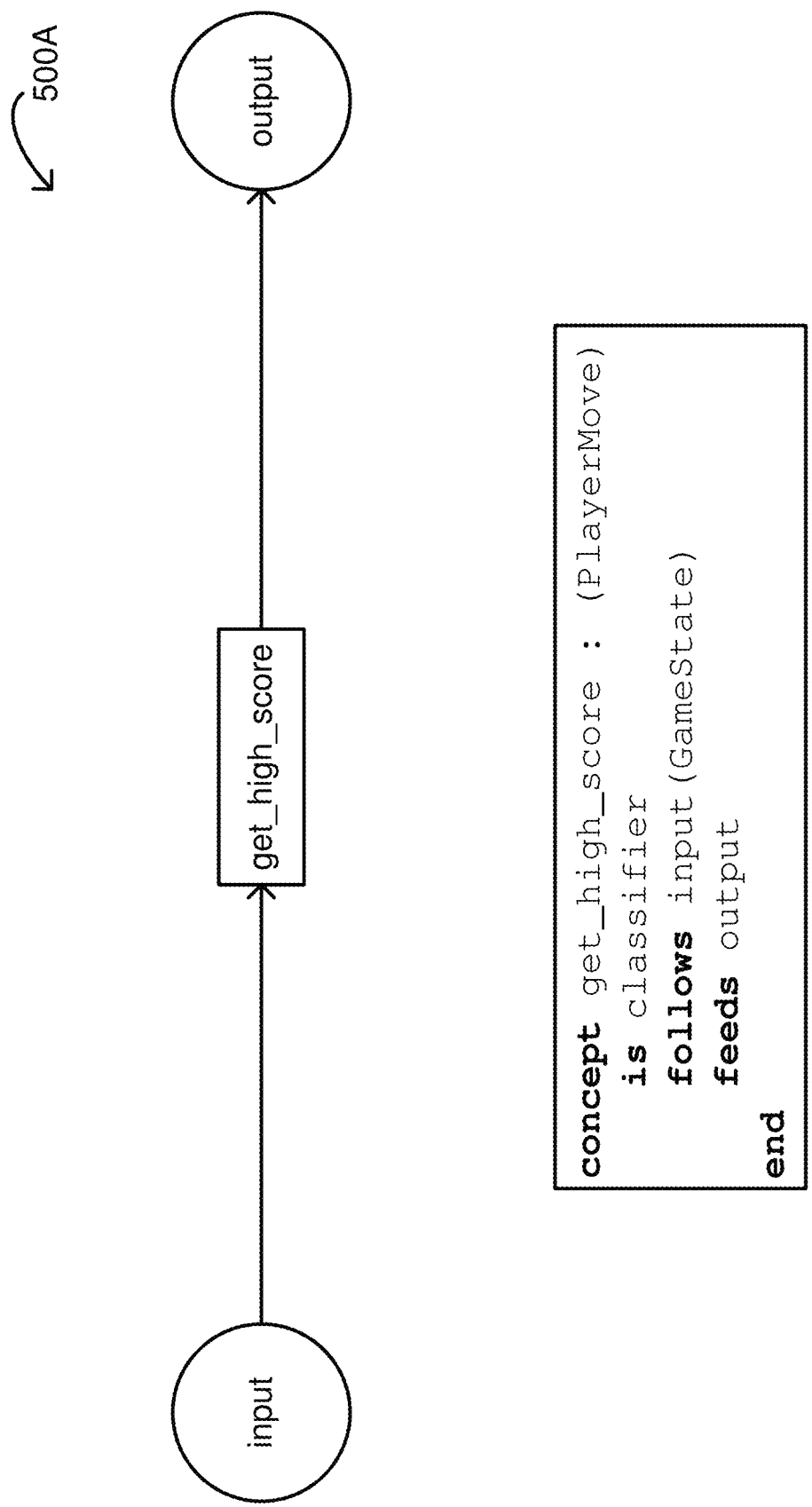

FIG. 3A provides a block diagram illustrating a mental model in accordance with an embodiment.

Figure 3B:
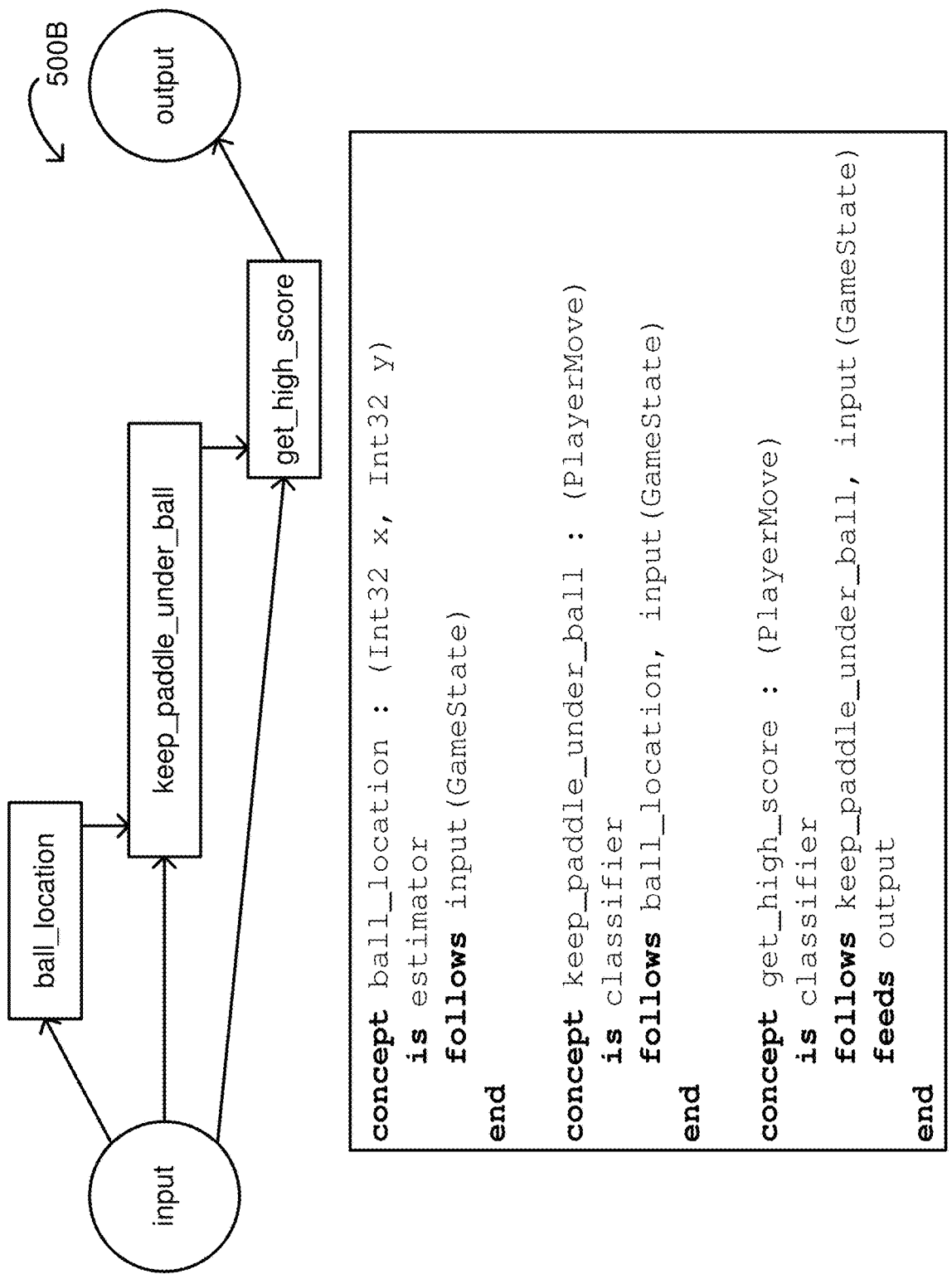

FIG. 3B provides a block diagram illustrating a mental model in accordance with an embodiment.

Figure 4:
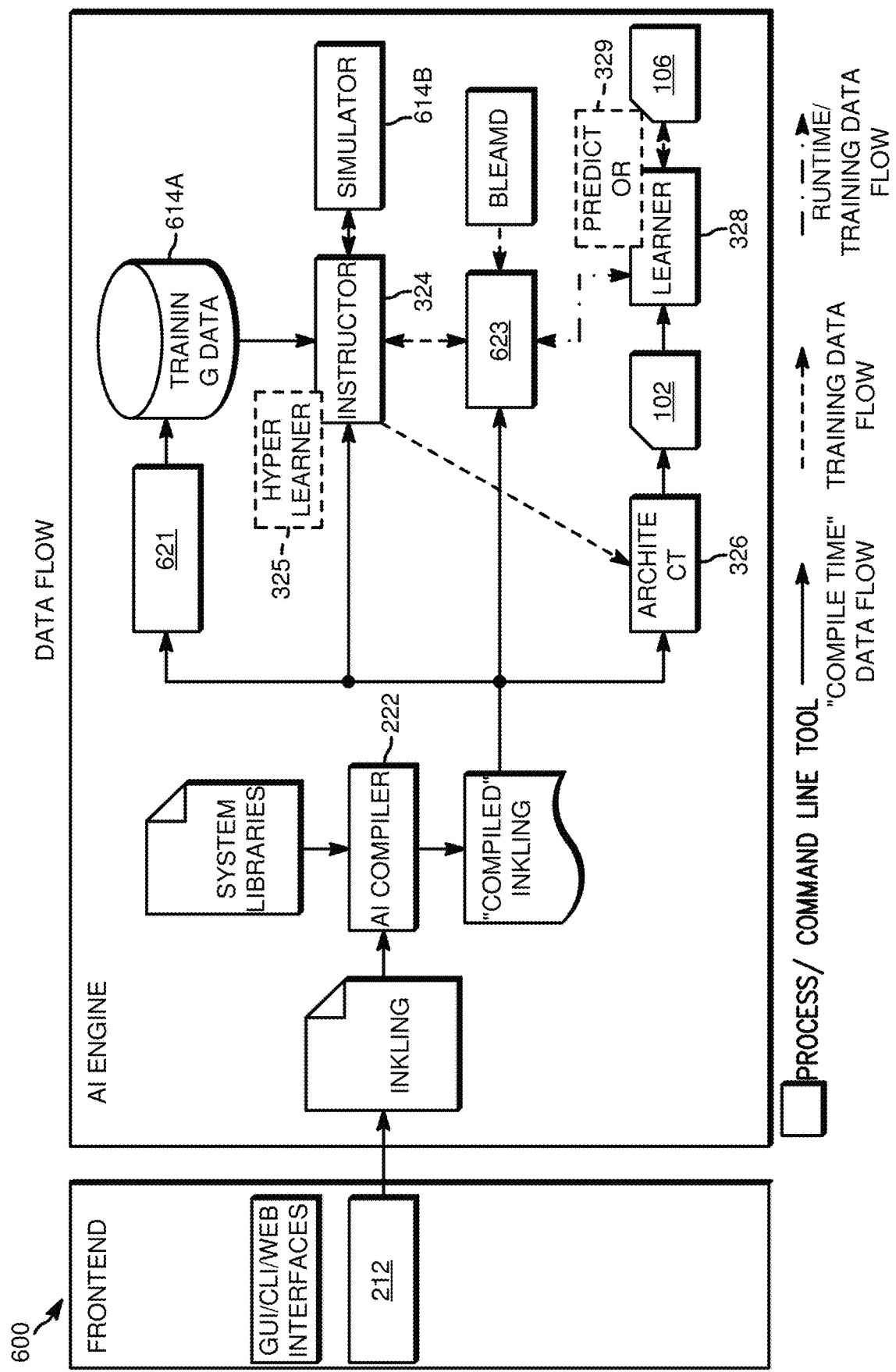

FIG. 4 provides a block diagram illustrating an AI engine with multiple independent processes in accordance with an embodiment.

Figure 5A:
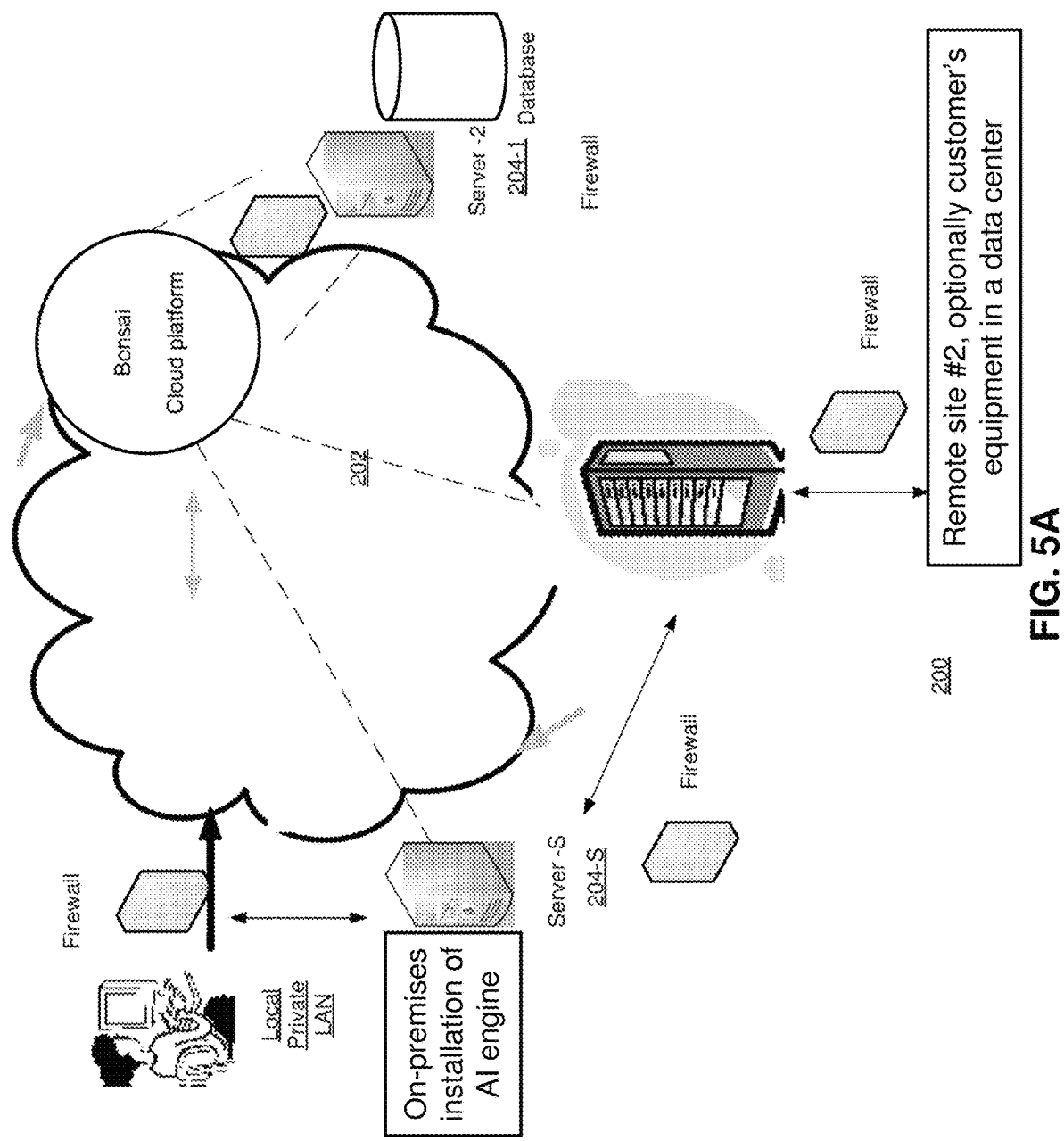

FIG. 5A provides a schematic illustrating one or more example networks with reference to an embodiment of the AI system of FIGS. 1A-1C in accordance with an embodiment.

Figure 5B:
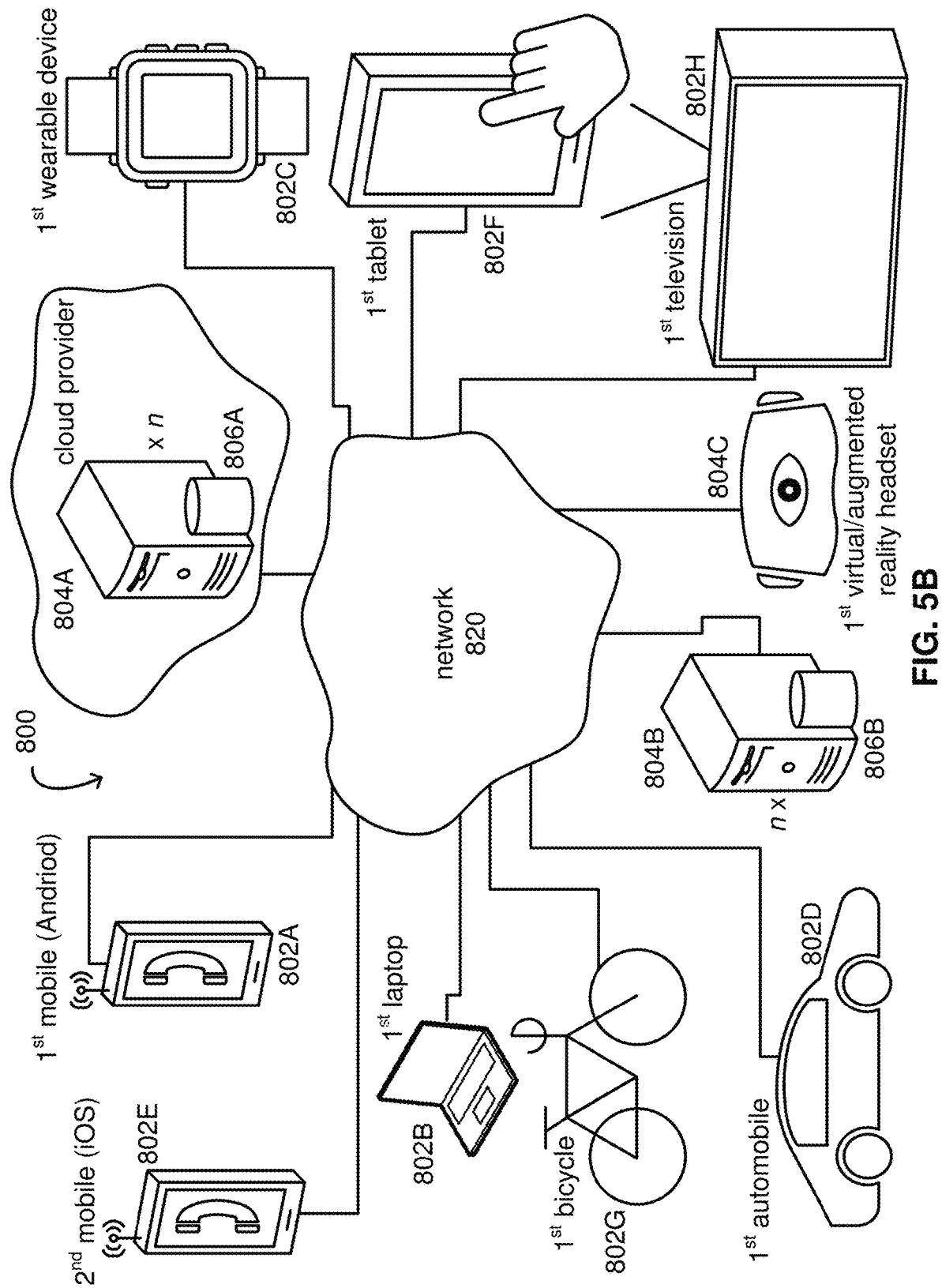

FIG. 5B provides a schematic illustrating one or more example networks with reference to an embodiment of the AI system of FIGS. 1A-1C in accordance with an embodiment.

Figure 6:
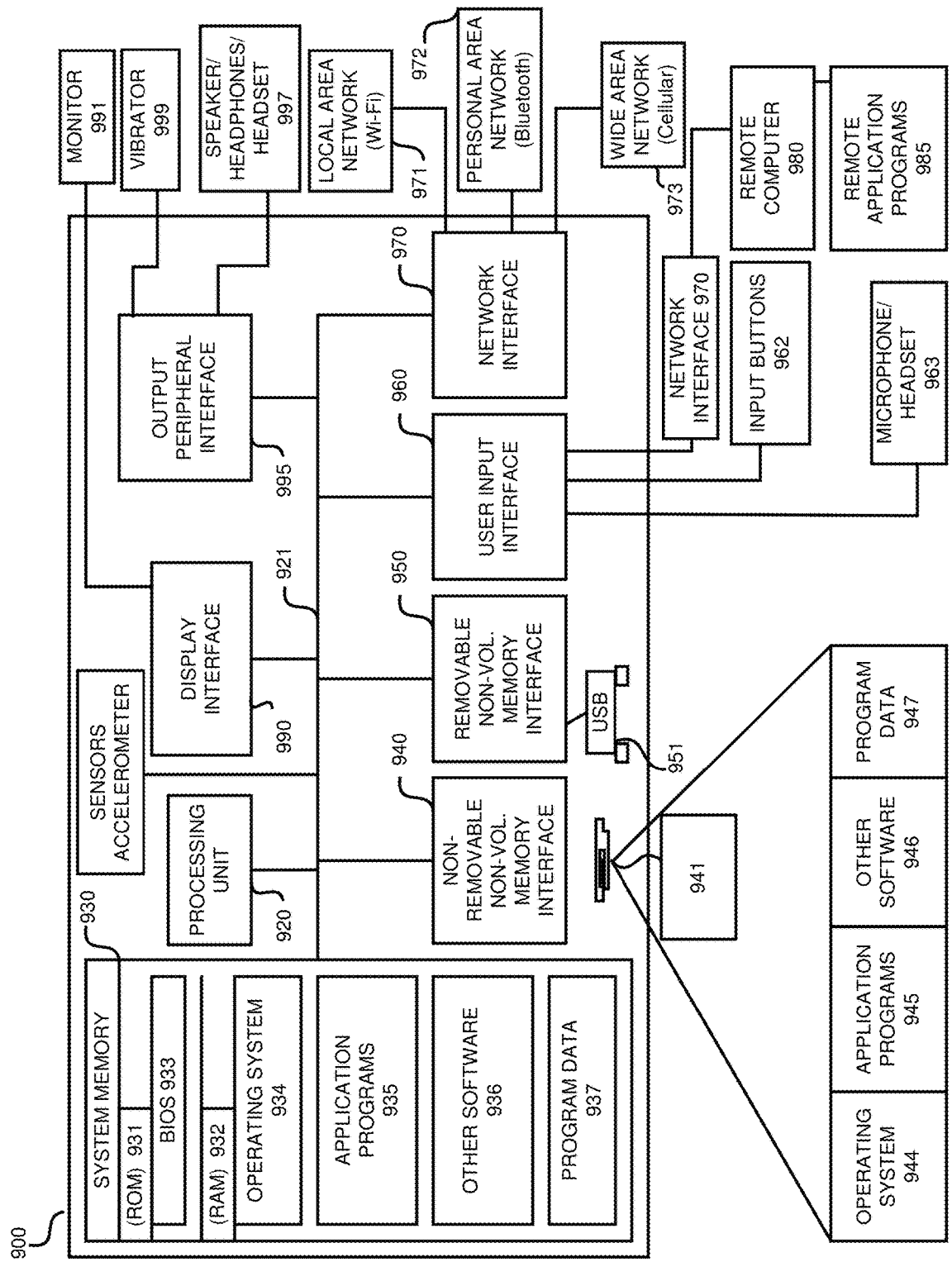

FIG. 6 provides a block diagram illustrating one or more computing systems that can be, wholly or partially, part of one or more of the server or client computing devices making up the one or more computing platforms in accordance with an embodiment.

Figure 7A:
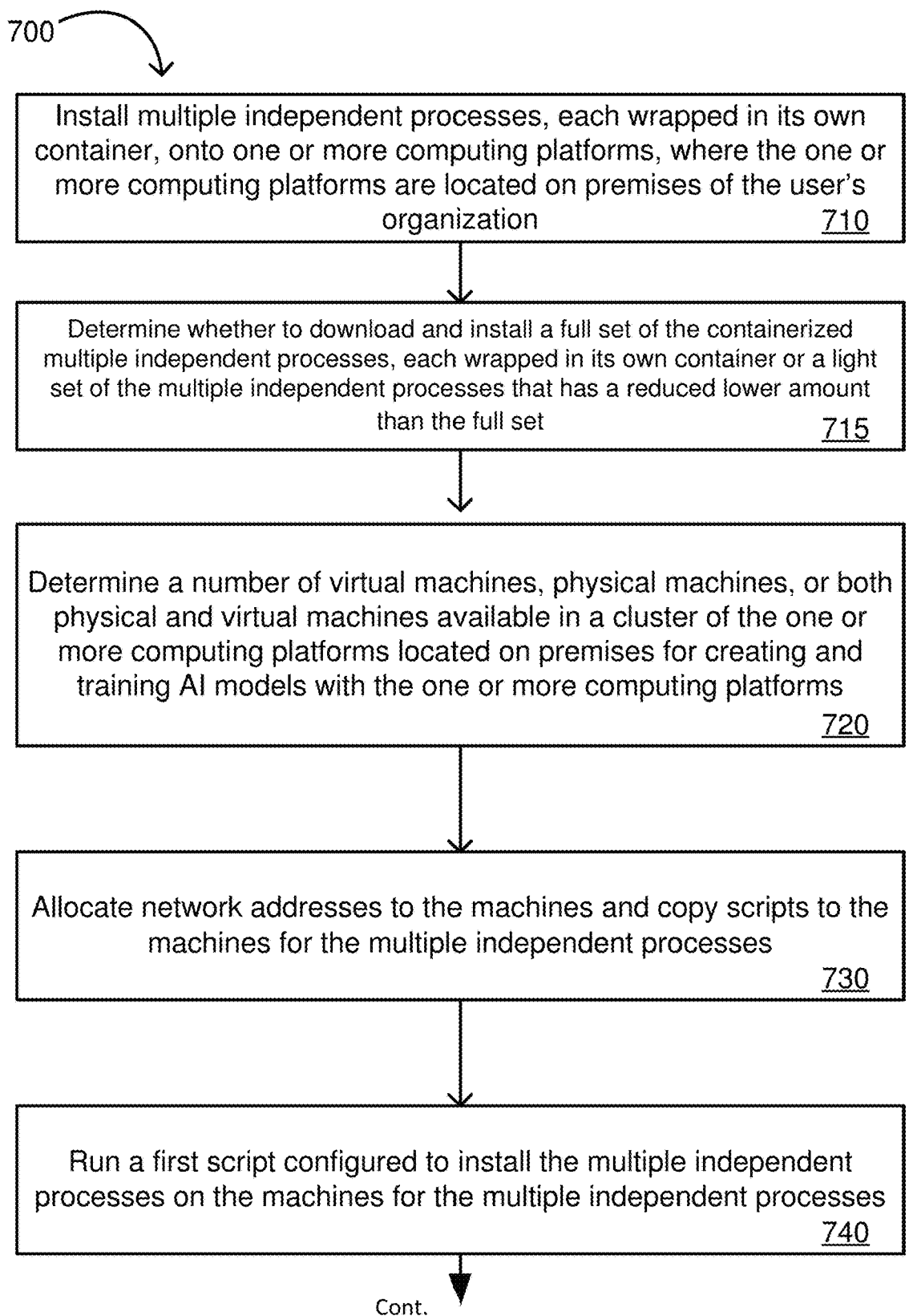
Figure 7B:
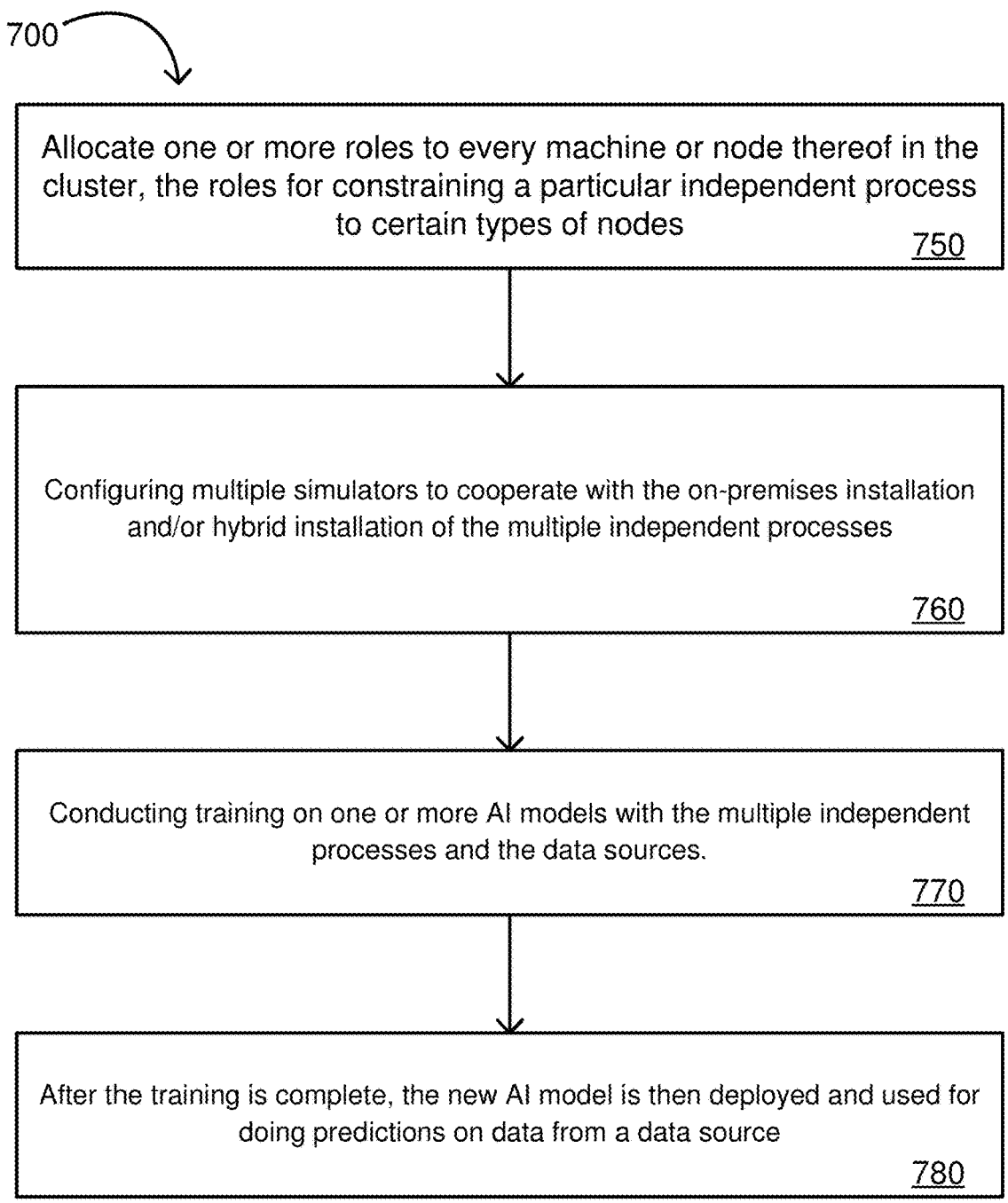

FIGS. 7A and 7B provide a flow diagram illustrating a method of installing multiple independent processes, training the AI model, and deployment of the AI model in accordance with an embodiment.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, memory in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first database, can be made. However, the specific numeric reference should not be interpreted as a literal sequential order but rather interpreted that the first database is different than a second database. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, an AI engine is discussed having multiple independent processes on an on-premises-based platform optionally in combination with a cloud-based platform, which can be a public, virtual private, or private cloud-based platform.

With respect to an on-premises installation, all software needed for at least basic operation of the AI engine is installed on an organization's own hardware, for example, in a data warehouse. The AI engine or the organization's hardware on which the AI engine is installed can have i) network access, ii) limited network access, or iii) no network access outside the organization. With network access or at least limited network access, the AI engine can be configured to provide crash dumps, usage data, or a combination thereof to an online system configured to account for the foregoing.

Reasons for an on-premises installation of the AI engine include, but are not limited to, or more of the following: 1) No or limited Internet access restricting data transfers. For example, there might be a prohibitively large amount of data (e.g., simulator data) to send to a cloud-based platform for training an AI model. 2) Data locality. For example, a user might want to have immediate access to data or tight control over the data. 3) Choice of hardware. A user might want different CPUs/GPUs, different number of CPUs/GPUs, different ratios of CPUs/GPUs on an on-premises installation than what is available in a cloud-based platform. 4) Complete or total administrative rights over hardware.

An on-premises installation of the different processes of the AI engine may occur using Salt or some other similar configuration management technology. The AI engine can be adapted to accommodate different configurations of hardware on the customer's premises.

In general, installation of the multiple independent processes can involve installing the entire AI engine platform and the associated simulators or just a portion on the computing platforms located on-premises of the user's organization. Setup can involve connecting the installed the multiple independent processes and simulators together and setting up the environments to start training and deployment of AI models. Training mode can involve creating a new AI model, defining the state:action:reward functions, connecting a simulator and using the some or all of the multiple independent processes and simulators to train the new AI model. Tuning mode happens after a trained AI model (and its associated files) have been taken and deployed to an environment that is as close as possible to the real world application in a controlled environment (this may or may not be a simulation) or a lab, before deploying the AI model to the real world. A trained or tuned AI model, when used, in Predict mode, is then deployed to cloud or to on-premises configurations (in a controlled environment or real world application) and uses statistics and other algorithms to depict outcomes. An AI model may go through several iterations of Train -> Tune -> Predict to be ready for final use and large scale deployment.

FIG. 1A through 7B illustrate one or more example systems and infrastructure to implement one or more of the above concepts.

An "AI model" as used herein includes, but is not limited to, neural networks such as recurrent neural networks, recursive neural networks, feed-forward neural networks, convolutional neural networks, deep belief networks, and convolutional deep belief networks; multi-layer perceptions; decision trees; self-organizing maps; deep Boltzmann machines; and Stacked de-noising auto-encoders. The independent processes of the AI engine are configured to utilize many different machine learning algorithms to generate, predict with, and/or train a resulting AI model.

Computing Platforms Infrastructure

FIG. 1A provides a block diagram illustrating an AI system 700B and its on-premises based computing platforms infrastructure in accordance with an embodiment. The AI system 700B includes at least one or more CPU computing devices such as a first CPU computing device 709A, which can be part of an on-premises installation of the AI system 700B. The AI system 700B can further include a second CPU computing device 709B, as well as one or more GPU computing devices such as a first GPU computing device 711A. Each of the computing devices can be part of the on-premises installation of the AI system 700B and located together on a same machine or separated in some combination on different machines of a cluster of machines communicatively coupled by way of, for example, a private subnet. Note, a cluster manager and scheduler, such as Nomad, can be configured to manage the cluster. The first CPU computing device 709A can be utilized by a compiler and an architect module/process that are part of an AI-model service. (See FIG. 2.) The second CPU computing device 709B can be utilized by an instructor module. (See FIG. 2.) The GPU computing device 711B can be utilized by the learner module/process and the predictor module/process.

Each of the independent process can be running its own computing device 709A-711A and then using a subnet to communicate communications between the other independent processes. As capacity exists, some independent processes may share a computing device. Also, using the subnets is much more secure than, for example, trying to conduct communications through the Internet by way of a gateway, which would possibly expose the communications.

Individual processes programmed to achieve and perform different functions within the AI engine are broken up into an individual process, each in its own software container. For example, 1) the architect process can be configured to create, instantiate, and figure out the topology of AI model corresponding to a concept being trained for artificial intelligence, 2) an instructor process can be configured to guide the training and how to do the training, and 3) a learner process to carrying out an actual execution of the training as well as 4) a predictor process, during an AI models deployment, to make use of a trained AI model. Breaking these up into individual processes/modules that are aware of each other and know which process and/or service to call and how to call that process and also know which inputs and outputs to send to each other, allows the training to be broken up into these multiple discrete individual services. Note, a module may contain one or more instances of a process as well as other components.

Each process can be configured as an independent process wrapped in its own container so that multiple instances of the same processes can run all at the same time. Thus, each process can be configured as an independent process wrapped in its own container so that multiple instances of the same processes, for example, learner and instructor, may be running simultaneously to scale to handle multiple users running training sessions for AI models, deploying AI modules, and creating AI models, all at the same time. Therefore, the computing platform for the AI engine exists with servers, processes, and databases, that allows many on-premises users to connect from multiple machines of the cluster of machines. The backend of the platform is configured to handle the scaling, efficiency, etc. by dynamically calling for additional computing hardware machines to load on and run the independent processes of, for example, an instance of the learner and/or instance of the instructor.

Note, functionality performed by one software process may be combined into another software process or migrated in part to another software process. For example, in an embodiment, the 'instructor' and 'learner' processes are merged into a single, combined process running within a single container named the 'scholar.' Thus, the 'instructor' and 'learner' may be implemented as independent processes. Each independent processes running in its own container. However, for performance reasons these 'instructor' and 'learner' processes may be merged into a single, combined process running within a single container named the 'scholar'. The functionality in the 'instructor' and 'learner' is still present as before, just not in independent processes.

The multiple independent processes carry out four or more separate tasks by interaction with and cooperation between the multiple independent processes. A first task can be creating a shell of an AI model, such as creating a BRAIN. A second task can be loading in a file of scripted code in a programming language to help define 1) a topology of processing nodes in the AI model, 2) a layout of the concepts making up the AI model, and 3) a selection of an appropriate learning algorithm for the AI model. The file, created in a pedagogical software programming language such as Inkling™, helps the architect process to create the topology of processing nodes in the AI model, the layout of the concepts making up the AI model, etc. derived from the programming code. The third task is starting to train the AI model with a data source, such as a simulator. The fourth task is then deploying and using a trained AI model to do, for example, predictions on data from the data source.

Each independent process, such as 1) the instructor module, 2) the learner module, and 3) the architect module as part of an AI-model service can be configured to be able to operate on either of a CPU computing device or a GPU computing device or both. Note, a software process may be an instance of an executable file configured to perform a task in a finite amount of time i.e. a job. Thus, each process is configured to operate for a finite amount of time to achieve its configured goal and then shut down until invoked again when needed in the future. Several instances of a same process each wrapped in its own container may run simultaneously on one or more computing devices. A service may be a process, which runs in the background. Each independent process is configured to be aware of the existence of the other processes and knows whom to call and what data and types of inputs that other processes looking for.

The individual processes in the AI engine utilize a scaling hardware platform, such as Amazon Web Services ("AWS") for an on-line installation (and similar set up for an on-premises installation), so that the individual processes of the AI engine, the amount of Central Processing Units (CPUs), Graphics Processing Units (GPUs), and RAM may dynamically change overtime and rapidly change to scale to handle multiple users sending multiple AI models to be trained.

For example, an engineer service can be configured to dynamically change an amount of computing devices 709A, 709B, 711A, over time, running independent processes in order to rapidly change the amount to scale to handle multiple users (and/or simulators) sending data to train one or more AI models. A conductor service or an engineer service can cause a first instance of an instructor process to be instantiated, loaded onto a first CPU computing device, and then run on the first CPU computing device 709B.

Note, installing the multiple independent processes onto one or more computing platforms located on-premises of the user's organization improves a lag time and amount of computing cycles for a subsequent training of the AI models compared to a simulator located on-premises and training with a cloud based only computing platform.

The processes of the AI engine installed on on-premises servers can generate AI models. The processes of the AI engine installed on on-premises servers can deploy AI models for prediction. The processes of the AI engine installed on on-premises servers can train AI models.

FIG. 1B provides a block diagram illustrating an AI system 700A and its cloud-based computing platforms infrastructure in accordance with an embodiment. A backend cloud platform can exist of various servers, processes, databases, and other components that connect over a network, such as the Internet, to a plurality of computing devices. The backend cloud platform is configured to handle the scaling, efficiency, etc. Such a cloud platform can be a public cloud, Virtual Public Cloud, or a private cloud. Note, a similar scaling service is also implemented on the on-premises computing platforms.

In an embodiment, a user, such as a software developer, can interface with the AI system 700A through an online interface 701. However, the user is not limited to the online interface, and the online interface is not limited to that shown in FIG. 1B. An input may be supplied from an online API, such as www.bons.ai, a command line interface, and a graphical user interface such as an Integrated Development Environment such as Mastermind™. With this in mind, the AI system 700A of FIG. 1B can enable a user to make API and web requests through a domain name system ("DNS") 701, which requests can be optionally filtered through a proxy to route the API requests to an API load balancer 705 and the web requests to a web load balancer 707. Alternatively, the proxy service may be part of a service running on a CPU computing device. The API load balancer 705 can be configured to distribute the API requests among multiple processes wrapped in their own containers running in a containerization platform, such as a Docker type network for the cloud. The web load balancer 707 can be configured to distribute the web requests among the multiple processes wrapped in their own containers running in this containerization platform. The network can include a cluster of one or more central processing unit ("CPU") computing devices 709 and a cluster of one or more graphics processing unit ("GPU") computing devices 711. One or more services running in the network will scale to more or less CPU computing devices 709 and GPU computing devices 711 as needed. The CPU computing devices 709 can be utilized for most independent processes running on the swarm network. The GPU computing devices 711 can be utilized for the more computationally intensive independent processes, such as TensorFlow and the learner process. Various processes may run on either the CPU computing device 709 or in the GPU computing device 711, as capacity in that machine is available at the time.

As further shown in FIG. 1B, a logging stack, such as an Elasticsearch-Logstash-Kibana ("ELK") stack cluster, 713 can be shared among all production clusters for dedicated monitoring and an indexing/logging.

The cloud-based platform 700A with multiple independent processes is configured for the user to define the AI problem to be solved. In an embodiment, all of the individual processes are wrapped into a container program such as a Docker. The software container allows each instance of that independent process to run independently on whatever computing device that instance is running on.

FIG. 1C provides a block diagram illustrating an AI system 700C in a hybrid platform in accordance with an embodiment. In an embodiment, the AI system 700C is a hybrid configuration/hybrid platform between one or more computing platforms located on-premises as shown in FIG. 1A and one or more cloud-based computing platforms connected over the Internet as shown in FIG. 1B.

The AI engine has multiple independent processes on the computing platforms. The multiple independent processes can be configured as an independent process wrapped in its own container so that multiple instances of the same processes, e.g. learner process and instructor process, can run simultaneously to scale to handle one or more users to perform actions. The actions can include 1) running multiple training sessions on two or more AI models at the same time, in parallel, 2) creating two or more AI models two or more AI models at the same time, 3) running a training session on one or more AI models while creating one or more AI models at the same time, 4) deploying and using two or more trained AI models to do predictions on data from one or more data sources, and 5) any combination of these four, on the same AI engine.

CPU bound processes can include, for example, a document database for storing AI objects such as an AI database, a Relational Database Server such as POSTGRESQL™, a time-series database such as INFLUXDB™ database, an AI-model service including an architect module and AI compiler, an AI-model web service, a conductor service, a watchman service, a CPU Engineer service, an instructor process, a predictor service, and other similar processes. GPU Bound processes can include, for example, a GPU Engineer service, a learner process, and other computationally heavy services. For example, a first CPU computing device may load and run an architect module. A second CPU computing device may load and run, for example, an instructor process. A first GPU computing device may load and run, for example, a learner process. A first service such as an engineer service, may then change an amount of computing devices running independent processes by dynamically calling in a third CPU computing device to load and run, for example, a second instance of the instructor process, and calling in a second GPU computing device to load and run, for example, a second instance of the learner process.

Scaling in this system requires dynamically changing both 1) an amount of independent processes running and 2) an amount of computing devices configured to run those independent processes, where the independent processes are configured to cooperate with each other. The dynamically changing of an amount of computing devices, for example, more GPUs or CPUs in order to run additional instance of the independent processes allows multiple users to utilize the cloud-based system at the same time and to, for example, 1) conduct multiple training sessions for AI models in parallel, 2) deploy AI models for use, and 3) create new AI models, all at the same time. Clusters of hardware of CPU devices and GPU devices can be dynamically scaled in and out on, for example, an hourly basis based on percent load capacity used and an amount of RAM memory left compared to a current or expected need. The multiple independent processes improve an efficiency of the one or more computing platforms hosting the AI engine located on-premises of the user's organization by scaling over an amount of available computing platforms. The efficiency frees up the computing platforms to perform other functions when not be used by the processes. Further, the processes have been specifically coded to allow work distribution among different instances.

Again, in an embodiment, the AI system 700C is a hybrid configuration or hybrid platform between one or more computing platforms located on-premises as shown in FIG. 1A and one or more cloud-based computing platform connected over the Internet as shown in FIG. 1B. Such a hybrid platform provides data security for training with training data as well as scaling, which can be easier in the cloud-based platform because scaling requires dynamically changing both 1) an amount of independent processes running and 2) an amount of computing devices configured to run those independent processes. FIG. 5A provides a schematic illustrating how such a hybrid configuration or hybrid platform is networked in an embodiment.

In view of the foregoing, the AI engine having multiple independent processes on one or more computing platforms includes an on-premises installation such as that of FIG. 1A, optionally in combination with a cloud-based platform such as that of FIG. 1B, which provides the hybrid configuration or hybrid platform of FIG. 1C. The multiple independent processes are configured to have their instructions executed by one or more processors (see CPU and GPU of FIG. 1A, FIG. 1B, or both FIGS. 1A and 1B) in the one or more computing platforms.

The multiple independent processes are configured as a set of independent processes, each independent process thereof wrapped in its own software container. This includes at least an instructor process 324 and a learner process 328 as described in reference to FIG. 2. The instructor process is configured to carry out a training plan codified in a pedagogical software programming language. The learner process is configured to carry out an actual execution of underlying AI learning algorithms during a training session. The instructor process and the learner process of the set of independent processes cooperate with one or more data sources to train a new AI model.

Scaling on the Computing Platforms

As discussed, each independent process is wrapped in its own software container so that multiple instances of a same independent process can run simultaneously to scale to handle a number of actions. One such action is running multiple training sessions on two or more AI models at a same time in parallel. Another such action is creating the two or more AI models at a same time. Another such action is running a training session on one or more of AI models while creating the one or more AI models at the same time. Another is training one AI model with multiple simulations running in parallel to speed up the training time of that AI model.

A first instance of the multiple independent processes is configured to scale to handle the number of actions by dynamically calling in additional computing devices to load on and run additional instances of each independent process wrapped in its own container as needed. The first instance is therefore configured to dynamically change an amount of computing devices over time running the multiple independent processes to rapidly scale and handle multiple users sending multiple AI models to be trained. Each instance of the multiple independent processes is similarly configured to run independently on whatever computing device that instance is running on. The first instance is configured to cause, for example, a second instance of, for example, an instructor process to be instantiated, loaded onto a CPU computing device, and then run on the CPU of the computing device.

The multiple independent processes improve an efficiency of the one or more computing platforms hosting the AI engine by scaling over an amount of available computing platforms. Note, the processing of training requests from the instructor module on data from a plurality of simulators for training the AI models improves a utilization of the instructor module and the CPU, GPU, or DSP of the one or more processors, as applicable, than processing the training requests from a single simulator. Likewise, grouping of instructions from two or more simulations for training an AI model improves a utilization of the instructor module and the CPU, GPU, or DSP of the one or more processors, as applicable, than processing the training requests from a single simulation.

With respect to the one or more computing platforms located on-premises of a user's organization such as in FIG. 1A, one or more users in the user's organization has at least administrative rights over the one or more computing platforms such as through a common user interface for the one or more users on the one or more computing platforms. This enables the user's organization to configure hardware components of the one or more computing platforms to operate how the user's organization chooses to fit their needs to execute and load the multiple independent processes. In addition, the one or more users of the user's organization are able to physically access the one or more computing platforms when needed.

Installation of the multiple processes on the computing platform located on the organization's premises grants the organization secure access and control. This allow the organization to i) apply policy based rules, permissions, and limits (e.g. throttling, quota management), and monitor usage; ii) keep their computing platforms, data sources, and simulators safe from abuse and misuse; and total control over the data and resulting AI models. The hybrid architecture and on-premises installation provide ease of use and extensibility. The system provides the capability to help create and integrate connectors and hooks for organization's data sources and simulators into the multiple independent processes of the AI engine.

As shown in at least FIGS. 1A and 5A, the hardware components of the one or more computing platforms are connected to each other through a Local Area Network (LAN). The LAN is configurable such that the one or more users in the user's organization have a right to control an operation of the LAN. All of the multiple independent processes configured to load and execute on the one or more computing platforms, which platforms are all connected by the LAN. Processor architecture enhancements can be made to increase throughput on training AI models with the available processing components, such as graphics processing units (GPUs), central processing units (CPUs), and/or a Digital Signal Processors (DSPs).

FIG. 2 provides a block diagram illustrating an AI engine with multiple independent processes in accordance with an embodiment.

Brief Discussion of Components in the AI Engine

The AI engine for generating a trained AI model 106 can include one or more AI-generator modules selected from at least an instructor module 324, an architect module 326, and a learner module 328 as shown. The instructor module 324 can optionally include a hyperlearner module 325, and which can be configured to select one or more hyper parameters for any one or more of a neural network configuration, a learning algorithm, and the like. The hyperlearner module 325 can optionally be contained in a different AI-generator module such as the architect module 326 or the learner module 328, or the hyperlearner module 325 can be an AI-generator module itself. The learner module 328 can optionally include a predictor module 329, which can provide one or more predictions for a trained AI model. The predictor module 329 can optionally be contained in a different AI-generator module such as the instructor module 324 or the architect module 326, or the predictor module 329 can be an AI-generator module itself. The AI engine including the foregoing one or more AI-generator modules can be configured to generate the trained AI model, such as trained AI model 106, from compiled scripted software code written in a pedagogical software programming language via one or more training cycles with the AI engine.

Note, each trained AI model itself can be a collection of trained AI objects corresponding to a main concept and a set of sub concepts feeding parameters into the main concept. The AI database can index AI objects corresponding to the main concept and the set of sub concepts making up a given trained AI model so that reuse, recomposition, and reconfiguration of all or part of a trained AI model is possible.

One or more clients 210 can make a submission to create a trained AI model. Once a Mental Model (see FIGS. 3A and 3B) and Curricula have been coded in the pedagogical software programming language, then the code can be compiled and sent to the three main modules, the learner module 328, the instructor module 324, and the architect module 326 of the AI engine for training. One or more user interfaces 212, such a web interface, a graphical user interface, and/or command line interface, will handle assembling the scripted code written in the pedagogical software programming language, as well as other ancillary steps like registering the line segments with the AI engine, together with a single command. However, each module—the AI compiler module 222, the web enabled interface 221 to the AI engine, the learner module 328, etc.—can be used in a standalone manner, so if the author prefers to manually invoke the AI compiler module, manually perform the API call to upload the compiled pedagogical software programming language to the modules of the AI engine, etc., they have the flexibility and freedom to do so.

Thus, one or more clients 210 can send scripted code from the coder 212 or another user interface to the AI compiler 222. The AI compiler 222 compiles the scripted software code written in a pedagogical software programming language. The AI compiler 222 can send the compiled scripted code, similar to an assembly code, to the instructor module 324, which, in turn, can send the code to the architect module 326. Alternatively, the AI compiler 222 can send the compiled scripted code in parallel to all of the modules needing to perform an action on the compiled scripted code. The architect module 326 can propose a vast array of machine learning algorithms, such as various neural network layouts, as well as optimize the topology of a network of intelligent processing nodes making up an AI object. The architect module 326 can map between concepts and layers of the network of nodes and send one or more instantiated AI objects to the learner module 328. Once the architect module 326 creates the topological graph of concept nodes, hierarchy of sub concepts feeding parameters into that main concept (if a hierarchy exists in this layout), and learning algorithm for each of the main concept and sub concepts, then training by the learner module 328 and instructor module 324 may begin.

The instructor module 324 can request training data from the training data source 219. Training can be initiated with an explicit start command in the pedagogical software programming language from the user to begin training. In order for training to proceed, the user needs to have already submitted compiled pedagogical software programming language code and registered all of their external data sources such as simulators (if any are to be used) via the user interfaces with the learner and instructor modules 324, 326 of the AI engine.

The training data source 219 can send the training data to the instructor module 324 upon the request. The instructor module 324 can subsequently instruct the learner module 328 on training the AI object with pedagogical software programming language based curricula for training the concepts into the AI objects. Training an AI model can take place in one or more training cycles to yield a trained state of the AI model 106. The instructor module 324 can decide what pedagogical software programming language based concepts and streams should be actively trained in a mental model. The instructor module 324 can know what are the terminating conditions for training the concepts based on user criteria and/or known best practices. The learner module 328 or the predictor 329 can elicit a prediction from the trained AI model 106 and send the prediction to the instructor module 324. The instructor module 324, in turn, can send the prediction to the training data source 219 for updated training data based upon the prediction and, optionally, instruct the learner module 328 in additional training cycles. When the one or more training cycles are complete, the learner module 328 can save the trained state of the network of processing nodes in the trained AI model 106. (Note a more detailed discussion of different embodiments of the components making up the AI engine occurs later.)

More on an on-premises installation of the different processes of the AI engine that may occur using a SaltStack and/or similar container system that can be adapted to different configurations of hardware on the customer's premises.

Salt or some other similar container/configuration management technology as well as the system can be adapted to install the different configurations and processes of the AI engine. As discussed, a different configuration software package (e.g., Ansible, Chef, Puppet, etc.) can be used rather than the example Salt discussed herein.

The system may install different image files, engines, containers for programs or services defined in the image files, or a combination thereof for the AI engine on a customer's premises with Salt or another configuration software package and then create a cluster of nodes or machines. An installer script of the multiple independent processes is configured to install on an available hardware architecture of the one or more computing platforms. The first service is further configured to direct a first CPU computing device to load and run an architect process, a second CPU computing device to load and run an instructor process, and a first GPU computing device to load and run a learner process. The first service is further configured to assign roles of those processes to run on the available hardware architecture of the one or more computing platforms.

In a first step, the system finds out how many machines are available on-premises for the AI engine, which AI engine is configured to create, train, and manage one or more AI models (e.g. "BRAINs)." Next, the system can allocate Internet Protocol ("IP") addresses for the customer's machines and then copy the scripts for the independent processes onto the customer's machines. Then, the system runs the generic script to install the different independent processes, each in its own container. In an embodiment, the system has generated a light set of the current set of 12-20 containerized independent software processes to be reduced down to a lower amount if needed for any generic set up and then can customize the installation based on that customer's particular needs. For example, the light set might eliminate a MONGODB™ database, a time-series database such as an INFLUXDB™ time-series database, an AI-model service including an architect module, an AI compiler, an AI-model web service, a watchman service, and various combinations of these services, etc. In an embodiment, the system is configured to code the containers to run on different hardware processors found on the customer's premises such as INTEL™ x86 processors, as well as, if detected, an IBM™ POWER8™ processor.

Setup and Deploy

Provided herein is an AI engine and simulation platform designed for at least a number of on-premises users, enabling:
  Simulation workloads, which are an important part of the AI engine and simulation platform, to be done on-premises;
  Edge device (Internet of Things and robots) use cases;
  Fewer concerns such as network reliability, privacy and security concerns around proprietary data, sensitive applications, compliance, security etc.; and
  Customers having their own cloud (e.g., private cloud) as an option for an on-premises solution.

The aim is to provide enterprise customers and users, Information Technology ("IT") administrators ("IT admins"), customer success managers ("CSMs"), roboticists, developers, and data engineers (or members) with a platform capability across different hardware environments. The platforms include on-premises configurations for any AI-specific hardware (e.g., IBM™ Minsky, NVIDIA™ DGX™), edge devices (e.g., computer next to a CNC machine), or combinations thereof; cloud configurations including public clouds (e.g., AWS™, AZURE™, etc.), virtual private clouds ("VPCs") in public clouds, private clouds (e.g., including on-premises clouds); or a combination thereof such as a hybrid configuration including a mixture of an on-premises installation with one or more public, virtual private, or private clouds with an orchestration between the platforms. This empowers users to optimize and control for their respective use cases, by means of a) installing the platform in a cloud (e.g., private cloud) or on-premises to train the AI models and utilize the computing power of the cloud while maintaining security and privacy; b) deploying the trained AI model in the cloud (e.g., private cloud) for predictions or tuning; and c) deploying the trained AI model on-premises for predictions or tuning.

In an embodiment, the system and a service team will do the installation and upgrades of the different processes of the AI engine onto on-premises user hardware. In an embodiment, the system and a user's IT department will do the installation and upgrades of the different processes of the AI engine onto on-premises user hardware.

In an embodiment, the on-premises user hardware platform/environment includes a user's space on a public cloud, a user's private cloud, a user's on-premises hardware (e.g., Minsky cluster, a user's NVIDIA™ JETSON™ powering a robot, etc.), or a combination thereof.

In an embodiment, the end user can train, tune, predict, etc. with the installed platform.

Benefits of on-premises configurations, cloud configurations, or hybrid configurations thereof include a) managed configurations, enabling easier incorporation into IT architecture and dev-ops best practices; b) hybrid architectures, providing the security of an on-premises installation and convenience of clouds; c) secure access and control, which allows one to apply policy based rules, permissions, and limits (e.g., throttling, quota management), and monitor usage, as well as keep the backend, data sources, and simulators safe from abuse and misuse; and d) ease of use and extensibility, providing the capability to help create and integrate connectors and hooks for data sources and simulators.

Installing the different processes of the AI engine onto on-premises user hardware allows various user benefits. For example, a user can maintain possession of user data, including synthetic data generated by simulations, which can be proprietary, and which the user might not be comfortable putting in someone else's cloud—even if a virtual private cloud. In addition, the user might already have their own cloud offering hardware to run their simulations and AI training. Furthermore, the user might have existing simulation workloads that are perfected to run on their own on-premises user hardware. As such, users or companies worried about security need not share cloud instances with other companies when installing the different processes of the AI engine onto the on-premises user hardware.

Initially, users are provided with an easy way to install, configure, control, and monitor on private, VPC, and public cloud configurations, as well as certain on-premises edge devices. In addition, users are provided with an easy way to transfer an AI model trained in cloud configurations to one or more edge devices (e.g., Internet of Things ["IoT"] devices, robots, Computer Numerical Control ["CNC"] machines, etc.) for fine tuning or prediction.

Subsequently, users are provided with on-premises solution that can be hybridized in a hybrid implementation where the customer can deploy the platform on-premises and use the cloud to i) define rules and policies, if any, ii) push updates to the libraries, tools, and Command Lin Interface ("CLI") installed on-premises and track usage, iii) backup different versions of the AI models trained and implemented on-premises, and iv) view, compare, and share results from different simulations and AI model versions. The users are also provided with abilities to install, configure, control, and monitor one or more AI models on a AI specific hardware for training. The AI models trained on AI specific hardware can be transferred to one or more edge devices (IoT devices, robots, CNC machines, etc.) for fine tuning or prediction. In an embodiment, an AI model trained in the cloud can be transferred onto a robot or IoT device for tuning or prediction.

Installation

In an embodiment, the install process can be very manual and technically complex. In an embodiment, the system assists to simplify the install process and provide a smooth and interactive install experience for IT admins. In an embodiment, the install process can be the process outlined further herein.

For example, the installation process may have an initial step including planning to ensure the different independent processes of the AI engine will install on hardware with the processing and communications that optimize the function and performance of the instance of the independent software processes/service installing on that hardware device. For example, every server in the cluster should has access communication capability to the Internet. For example, the learner service greatly benefits from running on a node with an NVIDIA™ Graphics Processing Unit ("GPU"), so it can be constrained to nodes with a "GPU" role.

The AI engine can use Salt for configuration management. Initializing a cluster involves one or more of the following selected from designating a server as a master, allocating roles to any remaining servers (these will be minions), bootstrapping the master daemon on the master, and bootstrapping the minion daemon on every minion. Before bootstrapping the minions, every minion must have one or more roles assigned to it.

The system allocates roles to every node in the cluster. Roles are used during deployment to constrain microservices or independent processes to certain types of nodes. The roles supported include one or more roles selected from the following:

- docker_manager: Indicates that the node will operate as a manager in a Docker Swarm. These nodes will also be the ones that support the Docker service calls needed for in-depth debugging in case issues arise. Every cluster must have exactly 3 nodes (no more, no less) with a docker_manager role. The docker_manager role is mutually exclusive of the docker_worker role.
- docker_worker-Every node that is not a docker_manager must be a docker_worker. These nodes participate in the Docker Swarm but cannot run any of the Docker service calls.
- cpu-Runs the Application Programming Interface ("API"), web, and other infrastructure services. Also runs the instructor service for each training of an AI model.
- gpu-Runs the learner. Nodes with a GPU role usually have NVIDIA™ GPUs for accelerated calculations.
- db-Runs the databases used by the AI engine. Databases include MONGODB™ for AI model definitions, POSTGRESQL™ for user data, and INFLUXDB™ for time-series data. These services are heavy consumers of resources on the node, so it is best to not have a node serve in both the db and CPU or GPU roles.
- diag-Runs diagnostic services, including PROMETHEUS™ for metrics collection, LOGSTASH™, ELASTICSEARCH™, and GRAFANA™. These services are heavy consumers on the node, so it is best to not have a node serve in both the diag and CPU or GPU roles.
- config-Runs the consul cluster, used for centralized key/value retrieval and service discovery. Ideally, at least 3 nodes will have a config role.

Next steps of the installation process include one or more of the following steps. In a first step, the master is bootstrapped, which includes installing the master daemon on the server designated as the master. In a second step, the minions are bootstrapped including, for each minion that will be in the role group, both 1) transferring the files needed for the bootstrapping and 2) running the bootstrapper. In a third step, installation of the configuration manager (e.g., Salt) is verified, as well as all minion IDs created are verified as listed as Accepted Keys. In a fourth step, the configuration is confirmed as correct, which includes an examination of all the keys. This ensures all keys are correct and specific to that cluster, the release tag is correct, and all unnecessary keys are either deleted or commented out. In a fifth step, the Docker Registry certificates are prepared. In a sixth step, states particular to the configuration manager (e.g., Salt states) are applied. In a seventh step, the Docker Swarm is brought up. In an eighth step, the AI engine is brought up.

However, the steps executed above can vary per installation, per the specifics of the user's hardware and environment. For example, in a single-node cluster environment, merely a subset of the foregoing step would be implemented.

Installation pre-requisites include knowing, for example, an enterprises' AMAZON WEB SERVICES™ AWS™ or MICROSOFT™ AZURE™ account login details (username/password) if a hybrid configuration is to be utilized; getting a clear list of minimum hardware requirements needed for installing the AI engine; having password-less sudo permissions on the user's account; knowing the IP addresses of machines for installation of the platform; being able to log into every machine in the cluster; being able to use sudo commands without being prompted for password; and ensuring that every server in the cluster/on-premises machine has access to the Internet.

Tables 1 and 2 provide sample installation worksheets:

TABLE 1

Master Planning Worksheet

IP or DNS entry for the master
IP or DNS entry for the NFS server
NFS exported path
IP or DNS entry for the stack registry
Username for the master server
Quay.io username
Quay.io password
Mandrill API key

TABLE 2

Minion Planning Worksheet

| | Node Roles | | | | | |
|---|---|---|---|---|---|---|
| manager | worker | cpu | gpu | db | diag | config |

Node
IP
Addresses

One or more steps are used to create a master server, which steps include one or more of the following steps: Ensuring the installation prerequisites are met before starting the process; entering AWS™ or MICROSOFT™ AZURE™ login details during the setup process if a hybrid configuration is being used; initializing a cluster in AWS™ or AZURE™ with roles by 1) allocating a server as a master by way of its IP address and 2) allocating remaining servers as minions by way of their IP addresses; ensuring that the roles and their associated information are entered in a relevant file; and running Docker on different nodes in every cluster for the platform and the assigning those nodes Docker roles:

- docker_manager-Indicates that the node will operate as a manager in a Docker Swarm. These nodes will also be the ones that support the Docker service calls needed for in-depth debugging in case issues arise. Every cluster must have exactly 3 nodes (no more, no less) with a docker_manager role. The docker_manager role is mutually exclusive of the docker_worker role.

docker_worker-Every node that is not a docker_manager must be a docker_worker. These nodes participate in the Docker Swarm but cannot run any of the Docker service calls.

cpu-Runs the API, web, and other infrastructure services. Also runs the instructor service for each training of an AI model.

gpu-Runs the learner. Nodes with a GPU role usually have NVIDIA™ GPUs for accelerated calculations.

db-Runs the databases used by the AI engine. Databases include MONGODB™ for AI model definitions, POSTGRESQL™ for user data, and INFLUXDB™ for time-series data. These services are heavy consumers of resources on the node, so it is best to not have a node serve in both the db and CPU or GPU roles.

Diag-Runs diagnostic services, including PROMETHEUS™ for metrics collection, LOGSTASH™, ELASTICSEARCH™, and GRAFANA™. These services are heavy consumers on the node, so it is best to not have a node serve in both the diag and CPU or GPU roles.

config-Runs the consul cluster, used for centralized key/value retrieval and service discovery. Ideally, at least 3 nodes will have a config role.

The one or more steps used to create the master server further include one or more of the following steps: Allowing the system to create a file in a data serialization language such as YAML for roles and configuration; reviewing and verifying selections and/or entries before proceeding further; creating a tunnel into the chosen master server to transfer relevant files; choosing relevant Salt formulas; verifying the Salt formulas in the installation process; pointing the setup to pull the latest AI model repository from the relevant link; ensuring that both the Salt formulas and the AI-model repository have been transferred to the master server selected during the start of the setup process; installing the transferred Salt formulas, AI-model repository, and configuration files on the master server; monitoring the progress of the installation; and getting a verification check from the system upon completion of the installation.

The installation process also includes bootstrapping, which refers to getting an initial cluster up and running. By bootstrapping, each node is confirmed to have the correct information by indicating the node all the other nodes should synchronize to. In the event of a cluster-wide crash, bootstrapping functions the same way: that is, an initial node is picked, essentially deciding the cluster node that contains the database for moving forward with, which is necessary as the minions need to know where to get the installation information from.

The one or more steps used to create the minions include one or more of the following steps: Ensuring a YAML role file created while setting up the master exists in the right place and has correct configuration; and transferring the files needed for bootstrapping.

Table 3 provides a roles planning worksheet. For each unique set of roles selected in a row in the minions worksheet, a YAML file is created.

TABLE 3

Roles planning worksheet.

| | | Node Roles | | | | | | |
|---|---|---|---|---|---|---|---|---|
| | | mgr | wkr | cpu | gpu | db | diag | cfg |
| NODES | 10.0.2.1 | X | | | | X | X | X |
| | 10.0.2.2 | X | | | | X | X | X |
| | 10.0.2.3 | X | | | | X | X | X |
| | 10.0.3.1 | | X | X | X | | | |
| | 10.0.3.2 | | X | X | X | | | |
| | 10.0.3.3 | | X | X | X | | | |

From the above table, two groups are created:
Support #support.yml
roles: ["docker_manager", "db", "diag", "cfg"]
Compute #compute.yml roles: ["docker_worker", "cpu", "gpu"]

Every node in the example cluster belongs to either the support group or compute group.

In an embodiment, other independent processes cooperate together and contain functionality from the instructor module, the learner module, etc. For example, a scholar process is coded to handle both the training for a given concept (lesson management) and training a lesson. The scholar will also select parameters for the concept. The scholar will also select the algorithms and the topology of the graphs for the concept (e.g. does some of the job of the architect module). The scholar process trains a given concept (e.g. does the job of instructor and learner in an alternative architecture). When the AI engine trains the same concept or multiple different concepts in parallel then the AI engine will have multiple scholars running in parallel. A director module manages the training of a concept graph by calling for the instantiation of one scholar process for each concept being trained. A conductor process merely manages resource allocation required for training an AI model. The director module determines how the resources are used to train the graph of nodes in parallel. The director may also instantiate the graph of nodes itself. Each concept is trained by a scholar process and in the case of multiple concepts being trained in parallel multiple scholar processes are run simultaneously. This is all managed by the director module.

Concepts and Mental Models

FIGS. 3A and 3B provide schematics respectively illustrating mental models 500A and 500B in accordance with an embodiment.

Pedagogical programming focuses on codifying two main pillars: 1) What are the concepts associated with the problem domain and mentally how do they relate to each other? 2) How would one go about teaching those concepts?

A concept is something that can be learned. Once learned it can provide intelligent output. An AI object may learn and be trained on a particular concept. An AI object corresponding to a particular concept can receive input data from other AI objects/concepts and simulators, and send output data to other AI objects/concepts or as a AI object corresponding to a main concept produce a final result/output. A concept can be used in isolation, but it is typically more useful to construct some structured relationship of connectivity, such as a hierarchy, between the related concepts, beginning with the relatively simple concepts and then building into more complex concepts. For example, 'ball location' is a relatively simple concept; whereas, 'get high score' with the ball is a more complex concept. In another example, a complex mental model of flying a plane may have a main concept of 'flying a plane' and numerous sub concepts such as 'how to navigate and move a plane from point A to point B', 'how to avoid crashing into objects', 'how to take off into flight', 'how to land from flight', etc. Each of the sub concepts feeds one or more outputs either directly or indirectly into the main concept of 'flying a plane' when undergoing training on the main concept. The architect module 326 creates the structured relationship of connectivity between these concepts based on user supplied guidance in the pedagogical programming language code.

A concept in a pedagogical programming language may be something that an AI object can be trained on and learn. A concept can fall into one of at least two groups: fact and strategy. A fact-type concept can describe a state of one or more things such as an object, a ball, a character, an enemy, a light, a person, or the like. The state can be whether the one or more things are on or off, hot or cold, a number or a letter, or the like. The fact-type concept can also describe a location. A strategy-type concept can reflect a method or a behavior such as "avoid ghosts," "keep the paddle under the ball," "don't run into walls," "turn lights off," "get high score," or the like. Both FIGS. 3A and 3B show mental models including the strategy-type concept "get high score."

A mental model in a pedagogical programming language is also something that an AI object can be trained on and learn. A mental model can include one or more concepts structured in terms of the one or more concepts, and the mental model can further include one or more data transformation streams. As shown in FIG. 3A, a single-concept mental model can include, for example, a strategy-type concept such as "get high score." As shown in FIG. 3B, a multi-concept mental model can include a hierarchical structure including, for example, strategy-type concepts such as "keep paddle under ball" and "get high score" and state-type concepts such as "ball location." The sub concepts of "keep paddle under ball" and "ball location" feed parameters directly or indirectly into the main concept of "get high score" with the ball. A concept in a multi-concept mental model can receive input from other concepts in the mental model, send output to other concepts in the mental model, provide a final output or result output, or a combination thereof. Addition of more concepts to a mental model can decrease training time for an AI object, as well as enable a trained AI object to give smarter, more accurate predictions. Each trained concept may be AI object.

Foundational Primitives

AI systems and methods provided herein enable a teaching-oriented approach by providing a set of foundational primitives that can be used to represent AI without specifying how the AI is created. These foundational primitives are 1) concepts and mental models, 2) curricula and lessons, and 3) training sources.

More on Concepts and Mental Models

As discussed, the term Mental Model may describe a set of structured concepts. The collection of concepts and their interrelation models the problem domain; and, can be referred to as the mental model. Given this choice of mental model frames, one would then codify the underlying concepts and their relationships.

Curricula and Lessons. A Curriculum is used to teach a concept. To do this, the user needs to provide data to train the concept and tell the AI engine whether the system's understanding of the concept is correct or not. This is analogous to a teacher assigning readings from a book to a student and subsequently testing the student on the contents of the book. The ways in which this data is presented is broken into individual components called Lessons. In the book analogy, Lessons could be individual chapters in the book. Lessons allow the concept to learn bit-by-bit, rather than all at once.

The concept keyword declares an abstract concept that is to be learned by the system. Ultimately, this takes the form of a transformation of data, but no information need be provided about how to perform the calculation. By declaring a concept in the scripted in a pedagogical software programming language, the programmer instructs the architect module 326 of the AI engine that this is a node in the recurrent AI network making up the AI model that must be learned. Consequently, each concept node must have corresponding curricula to teach that node of performing its output function based on its input parameters.

Because concepts are learned by each AI model, their declarations tend to be fairly simple unless one wants to explicitly tell the architect module 326 of the AI what learning algorithms and architecture to use. A typical statement will look something like this:

concept AbstractConceptName
is estimator, classifier, etc.
follows AntecedentConcept1, AntecedentConcept2
feeds DependentConcept1

In an embodiment, the 'follows and feeds keywords' establish connectivity in the directed graph of nodes in the trained AI model in the same way that the 'from and into keywords' do in stream declarations. In addition, however, one can optionally append a plus or minus sign (+/−) to the end of the 'follows or feeds keywords' as hints to the architect module 326. The presence of the plus or minus sign indicates whether inhibition is disallowed or desired, respectively. This is useful in a recurrent context, where, for example, a concept may have many ambiguous interpretations and inhibition can aid in resolving the ambiguity.

The keyword specifies the overall class of concept that is being modeled. For example, a classifier will learn to identify a label corresponding to its input, an estimator will learn to predict a value, a predictor will learn sequences and predict subsequent items in a sequence, etcetera. This keyword the entirety of the code needed. The system will, using this code, proceed to determine an appropriate learning topology that can realize the intent. In this case, the architect module 326 laid out a deep learning neural network very much like LeNet. The instructor module 324 will then proceed to execute the best available lesson in the curriculum and will stream data to it. Upon deployment, a user would be able to stream an image into the system and get predictions out. Note that at no point were any low level artificial intelligence or machine learning algorithmic details codified by a user but rather these low level details were generated by the architect module 326 by pulling the topology of a given network processing nodes and a best machine learning algorithmic from reference databases.

An example of a trained AI model may be a Basic Recurrent Artificial Intelligence Network (BRAIN). A BRAIN is an individual AI agent, and it is programmed to learn using a software language such as Inkling™. Each BRAIN can reside in the AI engine, which manages and automates much of the lower level, complexities of working with AI. At its heart, a BRAIN can be a basic network of intelligent processing nodes that comprise a potentially recurrent network, hence the acronym "BRAIN." In an embodiment, a trained AI model, such as trained AI model 106, may be a pedagogically programmed AI model that has been trained on one or more concepts.

The Multiple Independent Processes Carry Out Four or More Separate Tasks

Multiple independent processes in an AI engine carry out four or more separate tasks by 1) interaction with and 2) cooperation between the multiple independent processes. A first task can be creating a shell of an AI model, such as creating a shell of a BRAIN. A second task can be loading in a file of scripted code in a programming language to help define a topology of processing nodes in the AI model, a layout of the concepts making up the AI model, and a selection of an appropriate learning algorithm(s) for the AI model. The file created in the pedagogical software programming language, such as Inkling™, helps the architect module to create the structural details and other details of the AI model. The third task can be starting to train the AI model with a data source, such as a simulator. The fourth task can be then deploying a trained AI model and using the trained AI model to do predictions on data from the data source.

Some of the major independent processes configured into the AI engine can be as follows. An AI-model service may include a HTTP application programming interface, an AI compiler, and an architect module. Note, the architect module could be 1) an independent process on its own or 2) part of the AI-model service as here in this example. Another independent process is the instructor process and CPU engineer service. Another independent process is the predictor process. Another is the watchman process. Another is the learner process with its GPU engineer service. Another is the conductor. Another is the AI-model web service. Note, most of these processes are standalone services but they can be incorporated into a larger coding file to be part of another service or process. A software container is configured to wrap one or more pieces of software in a complete file system containing everything for execution including code, runtime, system tools, system libraries, etc. Note, the HTTP API may be a restful API. Note, an API may allow the on-premises installation have direct access to the modules of the AI engine.

In an embodiment, the CPU engineer may be coded to invoke and put processes onto the CPU computing devices including instances of the instructor process and predictor process, when needed. The GPU engineer may be coded to invoke and put, for example, instances of the learner process onto the GPU hardware as needed. The conductor service and/or engineer service may be configured to handle scaling by dynamically calling in additional computing devices to load on and run additional instances of one or more of the independent processes wrapped in its own container, such as the learner and/or instructor, as needed. When instances of the learner process and/or instructor process are not available to effectively run a training session of a given AI model, then a new instance of the learner process and/or instructor process is invoked and run on a computing device.

The multiple independent processes are further configured as an independent process wrapped in its own software container so that multiple instances of the same processes, (e.g., learner process and instructor process), can run simultaneously in order to scale to handle one or more users to perform actions to solve AI problems. The actions to solve AI problems can include 1) running multiple training sessions on two or more AI models at the same time, 2) creating two or more AI models at the same time, 3) running a training session on one or more AI models while creating one or more AI models at the same time, 4) deploying two or more trained AI models and using the trained AI models to do predictions on data from one or more data sources, and 5) any combination of these four, on the same AI engine. In an embodiment, five or more simulations may be simultaneously running at the same time. In an embodiment, ten or more training sessions may be simultaneously running at the same time. In an embodiment, twenty or more training sessions may be simultaneously running at the same time.

A service of the independent processes is configured to handle scaling by dynamically calling in additional computing devices to load on and run additional instances of one or more of the independent processes wrapped in its own container, such as the learner process and/or instructor process, as needed to handle all of the users and their AI problems. An independent process, such as a scheduler, monitors the amount of the available hardware resources, such as percent resources used. An independent process, such as the scheduler, also looks at the incoming resource requests from, for example, the amount of AI model deployments and training sessions occurring on the single AI engine, in order to decide to dynamically change the amount of computing devices operating instances of the independent processes that are in containers. The scheduler may cooperate with or be part of CPU engineer service, conductor service, and/or GPU engineer service. The scheduler may assign a role to each individual process, use an auto scaling service to scale the processes in their software containers in response to load across the systems services, and use a Load Balancer to distribute load across a current set of computing devices, while automatically checking new tasks into the load balancer when auto scaling actions occur. When the scheduler is asked to run a new task, the scheduler determines the individual processes, each in their own containers needing to accomplish the task, and then finds a suitable set of one or more computing machines to run the individual processes by identifying an instance in the cluster of computing devices with available resources. Long running processes, such as an instance of the learner and instance of the instructor, conducting a training session for a particular AI model could each run on its own GPU or CPU computing device in the cloud. An individual AI model being trained may only take a part of a CPU's capacity or may take up an entire GPU's capacity to train that AI model at that time. Multiple instances of the independent processes may be invoked to handle multiple AI models being trained or being deployed at the same time simultaneously. Note, each of the AI models maybe training or being deployed to solve a completely different problem in completely different technologies.

The first task can be creating a shell of an AI mode. In an embodiment in the first task, an architect module of the AI-model service receives a request from a client device of the user to create an AI model. Anyone of three or more different user interfaces may supply a command to request the creation of an AI model. The three different user interfaces are a command line interface, a web interface, and a graphical user interface such as Mastermind™. The three different user interfaces allow for multiple users of different levels of capability and programming to all utilize the AI engine hosted on this cloud platform. A request comes in to create an AI model into the AI-model web interface. The AI-model service is called by the AI-model web interface to create an AI model record for that user. The AI-model web interface may also make a call to a user's database in order to verify the account of the user and call up any previous information including account information about the user. The AI-model service then creates an AI model document by calling over to the AI database, for example, the MONGODB™ document database. The AI-model service registers the request and sends it on to the AI database. The AI database creates a new shell document to contain an AI model to be fleshed out with details and then trained. The new shell will have a unique ID number or at least a unique version of that ID model. When success is indicated, then the AI-model service via the AI-model web interface sends back to the client device of the user of the cloud platform that the initial shell document of the AI model has been successfully created. Thus, the AI-model service registers an incoming request and then creates a shell for the AI model with the architect module. Note, the architect module may be its own independent process in its own container or part of the AI-model service in its container.

The second task can be loading in a file of scripted code in the pedagogical software programming language to help define 1) a topology of processing nodes in the AI model, 2) a layout of the concepts making up the AI model, 3) a selection of an appropriate learning algorithm for the AI model, and 4) other similar details in order to flesh out the details of the AI model and then instantiate the AI model. In an embodiment in the second task, an architect module of the AI-model service receives scripted code to create a topology of neural networks, select one or more learning algorithms, and then instantiate an AI model assigned with a unique identifier, all based on a description of a problem to solve codified in a pedagogical software programming language. The loading of the file written in the pedagogical software programming language occurs. The file written in the pedagogical software programming language is put through a restful web socket. The file is sent to the AI-model service and then the AI-model service applies the AI compiler, which uses a library with executables to compile the scripted code and parse through the scripted code to detect errors in the syntax of the code, etc. The file created in the pedagogical software programming language, such as Inkling™, helps the architect module to design a graph of concepts, etc. in the AI model. The architect module of the AI-model service fills out a topology of the processing nodes in the model, a layout of the concepts making up the AI model, and selected appropriate learning algorithm(s) for this AI model into the shell of the AI model. The architect module may look at the type of problem being solved in the pedagogical software programming language and see what similar architectures have worked to solve a similar problem. The architect module portion of the AI-model service also then instantiates, for example, the topology for neural networks and graph of concepts for each concept node derived from statements written in the codified pedagogical software programming language. After the shell of the AI model with the topology of the graph of processing nodes is created with the appropriate learning algorithm(s) and has been assigned a unique ID, then the AI database stores the AI models as well as portions of AI models. After the shell of the AI model with the topology of the graph of processing nodes is instantiated with the appropriate learning algorithm(s) and has been assigned a unique ID, then the next task starts, which is training an instantiated AI model with a data source.

The third task is starting to train the AI model with some sort of data source, such as a simulator, according to a lesson plan and curriculum. In an embodiment in the third task, an instructor process is configured to carrying out a training plan codified in a pedagogical software programming language. The learner process is configured to carrying out an actual execution of underlying AI learning algorithms during the training session. The learner module can also consistently update weights of the learning algorithm(s) in the AI model. The instructor process and the learner process of the independent processes cooperate with one or more data sources to train a new AI model. The conductor, via an API, receives a start and set up training command. The conductor may be coded as a service. The conductor service in combination with the AI-model service can be the components in the system responsible for coordinating activities between the instructor process, the learner process, and the training data source. In an embodiment, the conductor is a Docker-type service.

In an embodiment, a client device of the user starts the training of an AI model, via a user interface, by sending a call command to send to train the AI model to the AI-model service. The AI-model service then sends a start training components command to the conductor. The conductor then sends a request to the AI database to retrieve the instantiated AI model. In an embodiment, the copy of the latest version of the AI model is retrieved. Note, in an embodiment, the conductor obtains multiple versions of the AI model, potentially with different neural networks and learning algorithms in order to train two or more instances of this AI model in parallel on the same AI engine. Each AI model is then trained with its own instances of the independent processes of the learner and instructor. The conductor sends a start instructor command to the CPU engineer, which then starts an instance of the instructor process on a CPU computing device. The CPU engineer invokes as many instances of the instructor process as necessary/as needed to service the multiple AI model's being trained. Each time another AI model is being trained another instructor process may be invoked. The conductor also sends a start learner command, via a call, to the GPU engineer. The GPU engineer invokes and starts an instance of a learner module on an available GPU computing device. The GPU engineer invokes as many instances of the learner process as necessary/as needed to service the multiple AI model's being trained. Once the instance of the instructor is loaded onto and running on the CPU hardware, the instructor then may go to the AI database to get the curriculum and lessons from the AI database. Training lessons may come from the pedagogical software programming language file, which was compiled and put into the AI database as a document associated with this AI model being trained. Similarly, the learner process once started will send a command to the AI database to get a document of the concepts, their curriculum, and the individual lessons to be trained on, which can be derived from the codified pedagogical software programming language and/or reference databases of best training practices. Note, the learner may receive most of the commands on the training from the instructor process conducting the training session in accordance with the curriculum and individual lesson plans.

Next for the training, the data sources register with the AI-model web interface. The AI-model service opens the web socket, for example, for simulation through the open web socket. The AI-model service acknowledges the registration with the data source. The AI-model service then directly talks to the instructor process that a data source is ready to start sending data to the instructor process. The instructor process sends back that it is ready to start the training. A start command to the data source, such as a simulator, random data generator, etc. is initiated. The data source then connects to the AI model. A recursive and reiterative loop occurs between the instructor process, the learner process, and the data source to send data to the AI model for training. Based on the new data, the AI model updates the state information of different portions making up the AI model and the instructor process sends the updated state information back to the data source. The data source sends more data and/or a prediction to the instructor process. This loop occurs between the instructor and the data source to send data and/or predictions, update and run the training, get back state, and then repeat.

Also, the instructor process can send state and prediction information to the learner process. Thus, in the recursive and reiterative loop, the learner process takes part in training of the instantiated AI model with the state information and predictions. The learner records the new state data for the AI model. The learner process records the episodes and reward information into a time database and sends the current function objective value back to the instructor process. The reiterative loop occurs between training with state and predictions, recording the reward information, and sending back the objective value and a current function occurs between the instructor and the learner. The learner continuously writes to the instructor with the state of the training and writes out new weights for the learning algorithms. Based on constraints or other statements in the code, such as Inkling™, eventually the learner knows when to stop the reiterative loop of sending data between the data source, training with that data, making predictions, adjusting coefficient weights, and getting better accuracy with the trained AI model. In the end, the criteria of the trainings are achieved. The instructor process will write out the trained network data to the AI database, where the model being trained has its own unique ID. The overall trained AI model will have learned optimum weights for the coefficients of the learning algorithms for each trained AI object corresponding to either a main concept or sub concept forming the trained AI model. The trained AI model with its unique ID and version of that AI model is then stored in the AI database.

The independent processes include a watchman service configured to monitor to see if any of 1) when failures occur in any of the other independent processes and 2) when any of the other independent processes exit, and then to tell all of the independent processes that were participating in that training to exit the training session that they were cooperating in. Similarly, the watchman service can monitor deployment and use sessions with the trained AI model and/or AI model creation sessions to tell all of the independent processes that were participating in that AI event to exit when a failure occurs or when one of the other independent processes exit.

The fourth task is then deploying a trained AI model and using the trained AI model to do predictions and/or other actions on data from one or more data sources, such as a simulator, random data generator, database, etc.

A trained AI model may then be used to predict many things. For example, trained AI model connected to a data source may predict what will occur 1) during an example simulation or 2) during real time streaming such as during a video game to make decisions for the digital creatures in that game, based on the training in the AI model. The data source connects to the trained AI model with a command to the AI-model service. The AI-model service then makes a call to the instructor process to launch a predictor process and to tell the instructor process that registration has occurred. The AI-model service loads the trained AI model. The AI-model service opens up the AI document database for registration. The AI-model service opens up a website socket for simulation. In addition, the AI-model service connects back to the data source and conveys that the data source is registered and that the predictor process is ready to start. Lastly, a loop repeats to start the simulation, send that data to the predictor, and the predictor then makes predictions based on the trained AI models, which are then sent back to the data source until the deployment of the AI model ends.

Note, the AI system uses software defined processes wrapped in a container over using individual daemons because the software defined processes, each in its own container, scale better to a dynamically changing amount or set of hardware configuration. The AI engine decoupled from using a set of daemons as coordinating agents between different functions in an AI engine, over to instances of self-sufficient independent processes, so that the AI engine system can scale to handle multiple users at the same time using the single AI engine hosted on the cloud platform. The multiple users may be creating AI models as well as training AI models.

Each module can be structured as an independent process so it may work with other processes but can exist outside and run its function without the need of the other processes.

More on the AI Engine

The AI system enables developers to more efficiently build, teach, and use intelligence models.

The AI engine takes in a description of a problem and how one would go about teaching concepts covering aspects of the problem to be solved, and the AI engine compiles the coded description into lower-level structured data objects that a machine can more readily understand, builds a network topology of the main problem concept and sub-concepts covering aspects of the problem to be solved, trains codified instantiations of the sub-concepts and main concept, and executes a trained AI model containing one, two, or more neural networks.

The AI engine can abstract generation of a neural network topology for an optimal solution and faster training time with a curriculum and lessons to teach the neural network via recursive simulations and training sessions on each node making up the neural network.

The AI engine can contain a vast array of machine learning algorithms, has logic for picking learning algorithms and guiding training, manages data streaming and data storage, and provides the efficient allocation of hardware resources. The AI engine can be built with an infrastructure that supports streaming data efficiently through the system. The AI engine can use a set of heuristics to make choices about which learning algorithms to use to train each AI model. The set of heuristics also make it possible for the AI engine to choose from any number of possible algorithms, topologies, etc., be able to train a number of AI models in parallel, and then pick the best result from all of the trained AI models as the best trained AI model for that task.

Major Components of the AI Engine

FIG. 4 provides a block diagram illustrating an AI system including an AI engine with multiple independent processes in accordance with an embodiment.

The details for any given implementation of an AI engine may vary substantially, but many have common architectural components such as the following six components: 1) an architect module 326, 2) an instructor module 324, 3) a learner module 328, 4) a compiler module 222, 5) a hyper-learner module 325, and 6) one or more interfaces 212 exchanging communications into and out of the AI engine.

The AI database 341 may cooperate with the modules of the AI engine as discussed above.

The AI engine can be installed on-premises. The AI engine can be a cloud-hosted platform-as-a-service configured to manage complexities inherent to training AI networks. The AI engine can be installed and spread across the computing platforms located on-premises and the computing platforms located in the cloud. Thus, the AI engine can be accessible with one or more client-side interfaces 212, GUI, CLI, and Web interfaces, to allow third parties to submit a description of a problem in a pedagogical programming language with possible sub concepts that factor in that problem and let the online AI engine build and generate a trained intelligence model for one or more of the third parties.

The AI system includes the coder 212 on the one or more client systems and the following on the one or more server systems: the AI compiler module 222; the AI-generator modules including the instructor module 324, the architect module 326, and the learner module 328, the hyperlearner 325, and the predictor 329 module 329. In addition to the foregoing, the AI system can include a training data loader 621 configured to load training data from a training data database 614a, a simulator 614b, and a streaming data server. The training data can be batched training data, streamed training data, or a combination thereof, and the AI engine can be configured to push or pull the training data from one or more training data sources selected from the simulator 614b, a training data generator, the training data database 614a, or a combination thereof. In an embodiment, a data stream manager can be configured to manage streaming of the streamed training data. FIG. 4 shows the architect module 326 configured to propose a neural network layout and the learner module 328 configured to save a trained state of a neural network such as the trained AI model 106.

The AI compiler module 222 automates conversion and compiling of the pedagogical programming language describing the problem (main concept) and sub-concepts factoring into the problem. Each statement recited in the code of the pedagogical programming language program submitted to the AI engine can be complied into a structured data object's defined fields, which can later be generated and instantiated into its own sub-concept node by the architect module 326. Each node can have one or more inputs one or more neural networks to process the input data and a resulting output decision/action. The compiled statements, commands, and other codifications fed into the AI compiler can be transformed into a lower level AI specification.

The Architect Module

The architect module 326 is the component of the system responsible for proposing and optimizing learning topologies (e.g., neural networks) based on mental models.

Neural networks can be based on a large collection of neural units loosely modeling the way a biological brain solves problems with large clusters of biological neurons connected by axons. Each neural unit is connected with many others, and links can be enforcing or inhibitory in their effect on the activation state of connected neural units. Each individual neural unit can have, for example, a summation function, which combines the values of all its inputs together. There may be a threshold function or limiting function on each connection and on the unit itself such that it must surpass it before it can propagate to other neurons. These systems are self-learning and trained rather than explicitly programmed and excel in areas where the solution or feature detection is difficult to express in a traditional computer program.

Neural networks can consist of multiple layers or a cube design, and the signal path can traverse from front to back. The goal of the neural network is to solve problems in the same way that the human brain would, although several neural networks are much more abstract. Modern neural network projects typically work with a few thousand and up to a few million neural units and millions of connections.

The architect module 326 can take the codified mental model and pedagogy and then propose a set of candidate low-level learning algorithms, topologies of a main concepts and sub-concepts, and configurations thereof the architect module 326 believes will best be able to learn the concepts in the model. This is akin to the work that a data scientist does in the toolkit approach, or that the search system automates in the approach with statistical data analysis tools. Here, it is guided by the pedagogical program instead of being a broad search. The architect module 326 can employ a variety of techniques to identify such models. The architect module 326 can generate a directed graph of nodes. The architect module 326 can break down the problem to be solved into smaller tasks/concepts all factoring into the more complex main problem trying to be solved based on the software code and/or data in the defined fields of the user interface supplied from the user/client device. The architect module 326 can instantiate a main concept and layers of sub-concepts feeding into the main concept. The architect module 326 can generate each concept including the sub-concepts with a tap that stores the output action/decision and the reason why that node reached that resultant output (e.g., what parameters dominated the decision and/or other factors that caused the node to reach that resultant output). This stored output of resultant output and the reasons why the node reached that resultant output can be stored in the trained intelligence model. The tap created in each instantiated node allows explainability for each step on how a trained intelligence model produces its resultant output for a set of data input. The architect module 326 can reference a database of algorithms to use as well as a database of network topologies to utilize. The architect module 326 can reference a table or database of best suggested topology arrangements including how many layers of levels in a topology graph for a given problem, if available. The architect module 326 also has logic to reference similar problems solved by comparing signatures. If the signatures are close enough, the architect module 326 can try the topology used to optimally solve a problem stored in an archive database with a similar signature. The architect module 326 can also instantiate multiple topology arrangements all to be tested and simulated in parallel to see which topology comes away with optimal results. The optimal results can be based on factors such as performance time, accuracy, computing resources needed to complete the training simulations, etc.

In an embodiment, for example, the architect module 326 can be configured to propose a number of neural networks and heuristically pick an appropriate learning algorithm from a number of machine learning algorithms in one or more databases for each of the number of neural networks. Instances of the learner module 328 and the instructor module 324 can be configured to train the number of neural networks in parallel. The number of neural networks can be trained in one or more training cycles with the training data from one or more training data sources. The AI engine can subsequently instantiate a number of trained AI models based on the concepts learned by the number of neural networks in the one or more training cycles, and then identify a best trained AI model (e.g., by means of optimal results based on factors such as performance time, accuracy, etc.) among the number of trained AI models.

The user can assist in building the topology of the nodes by setting dependencies for particular nodes. The architect module 326 can generate and instantiate neural network topologies for all of the concepts needed to solve the problem in a distinct two-step process. The architect module 326 can generate a description of the network concepts. The architect module 326 can also take the description and instantiate one or more topological shapes, layers, or other graphical arrangements to solve the problem description. The architect module 326 can select topology algorithms to use based on factors such as whether the type of output the current problem has either 1) an estimation output or 2) a discrete output and then factors in other parameters such as performance time to complete the algorithm, accuracy, computing resources needed to complete the training simulations, originality, amount of attributes, etc.

The Instructor Module

The instructor module 324 is a component of the system responsible for carrying out a training plan codified in the pedagogical programming language. Training can include teaching a network of intelligent processing nodes to get one or more outcomes, for example, on a simulator. To do so, the instructor module 324 can form internal representations about the system's mastery level of each concept, and adapt the execution plan based on actual performance during training. The directed graph of lessons can be utilized by the instructor module 324 to determine an execution plan for training (e.g., which lessons should be taught in which order). The training can involve using a specific set of concepts, a curriculum, and lessons, which can be described in the pedagogical programming language file.

The instructor module 324 can train easier-to-understand tasks earlier than tasks that are more complex. Thus, the instructor module 324 can train sub-concept AI objects and then higher-level AI objects. The instructor module 324 can train sub-concept AI objects that are dependent on other nodes after those other AI objects are trained. However, multiple nodes in a graph may be trained in parallel. The instructor module 324 can run simulations on the AI objects with input data including statistics and feedback on results from the AI object being trained from the learner module 328. The learner module 328 and instructor module 324 can work with a simulator or other data source to iteratively train an AI object with different data inputs. The instructor module 324 can reference a knowledge base of how to train an AI object efficiently by different ways of flowing data to one or more AI objects in the topology graph in parallel, or, if dependencies exist, the instructor module 324 can train serially with some portions of lessons taking place only after earlier dependencies have been satisfied. The instructor module 324 can reference the dependencies in the topology graph, which the dependencies can come from a user specifying the dependencies and/or how the arrangement of AI objects in the topology was instantiated. The instructor module 324 can supply data flows from the data source such as a simulator in parallel to multiple AI objects at the same time where computing resources and a dependency check allows the parallel training.

The instructor module 324 may flow data to train AI objects from many data sources including, but not limited to a simulator, a batch data source, a random-data generator, and historical/guided performance form from past performance. A simulator can give data and get feedback from the instructor module 324 during the simulation that can create an iterative reactive loop from data inputs and data outputs from the AI objects. A batch data source can supply batched data from a database in at least one example. A random-data generator can generate random data based on user-input parameters.

When starting a training operation, the instructor module 324 first generates an execution plan. This is the ordering it intends to use when teaching the concepts, and for each concept which lessons it intends to teach in what order. While the execution plan is executing, the instructor module 324 may jump back and forth between concepts and lessons to optimize the learning rate. By not training each concept fully before starting to train dependent concepts, the system naturally avoids certain systemic machine learning problems such as overfitting. The major techniques used to determine when to switch between lessons and concepts for training are reinforcement learning and adaptive learning. For example, for a first main problem of determining an amount of bankruptcy's in the United States, a first AI object corresponding to a sub concept may be trained in a first lesson on how to determine bankruptcy filings in California. A second lesson may train the first AI object next on how to determine bankruptcy filings in California and York. Successive lessons on an AI object can build upon and augment earlier lessons that the AI object was trained on.

The instructor module 324 looks to reuse similar training flows that have solved similar problems with similar signatures in the past.

Learner Module

The learner module 328 is a component of the system configured to carry out the actual execution of the low-level, underlying AI algorithms. In training mode, the learner module 328 can instantiate a system conforming to what was proposed by the architect module 326, interface with the instructor module 324 to carry out the computation and assess performance, and then execute the learning algorithm itself. The learner module 328 can instantiate and execute an instance of the already trained system. Eventually, the learner module 328 writes out network states for each trained sub-AI object and then a combination of the topological graph of the main node with all of the sub-nodes into a trained AI model. The learner module 328 can also write the stored output of each node and why that node arrived at that output into the trained AI model, which gives explainability as to how and why the AI proposes a solution or arrives at an outcome.

Hyperlearner Module

The hyperlearner module 325 can perform a comparison of a current problem to a previous problem in one or more databases. The hyperlearner module 325 can reference archived, previously built and trained intelligence models to help guide the instructor module 324 to train the current model of nodes. The hyperlearner module 325 can parse an archive database of trained intelligence models, known past similar problems and proposed solutions, and other sources. The hyperlearner module 325 can compare previous solutions similar to the solutions needed in a current problem as well as compare previous problems similar to the current problem to suggest potential optimal neural network topologies and training lessons and training methodologies.

Simulator

When, the curriculum trains using a simulation or procedural generation, then the data for a lesson is not data to be passed to the learning system, but the data is to be passed to the simulator. The simulator can use this data to configure itself, and the simulator can subsequently produce a piece of data for the learning system to use for training. This separation permits a proper separation of concerns. The simulator is the method of instruction, and the lesson provides a way to tune that method of instruction, which makes it more or less difficult depending on the current level of mastery exhibited by the learning system. A simulation can run on a client machine and stream data to the AI engine for training. In such an embodiment, the client machine needs to remain connected to the AI engine while the AI model is training. However, if the client machine is disconnected from the server of the AI engine, it can automatically pick up where it left off when it is reconnected. Note, if the system trains using data, then the data is optionally filtered/augmented in the lessons before being passed to the learning system.

Note, 1) simulations and procedural generation are a good choice versus data in a variety of circumstances; and 2) concepts are a good choice versus streams when you can more easily teach versus calculate.

Training Mode

A machine learning algorithm may have of a target/outcome variable (or dependent variable) which is to be predicted from a given set of predictors (independent variables). Using this set of variables, the AI engine generates a function that maps inputs to desired outputs. The coefficients and weights plugged into the equations in the various learning algorithms are then updated after each epoch/pass of training session until a best set of coefficients and weights are determined for this particular concept. The training process continues until the model achieves a desired level of accuracy on the training data.

When in training mode the architect module 326 of the AI engine is configured to i) instantiate the network of processing nodes in any layers of hierarchy conforming to concepts of the problem being solved proposed by the user and ii) then the learner module 328 and instructor module 324 train the network of processing nodes in that AI model. To effect the foregoing, the AI engine can take compiled pedagogical programming language code and generate a AI-model learning topology, and proceed to follow the curricula to teach the concepts as specified. Depending on the model, training can potentially take substantial amounts of time. Consequently, the AI engine can provide interactive context on the status of training including, for example, showing which nodes are actively being trained, the current belief about each node's mastery of its associated concept, overall and fine-grained accuracy and performance, the current training execution plan, and/or an estimate of completion time. As such, in an embodiment, the AI engine can be configured to provide one or more training status updates on training a neural network selected from i) an estimation of a proportion of a training plan completed for the neural network, ii) an estimation of a completion time for completing the training plan, iii) the one or more concepts upon which the neural network is actively training, iv) mastery of the neural network on learning the one or more concepts, v) fine-grained accuracy and performance of the neural network on learning the one or more concepts, and vi) overall accuracy and performance of the neural network on learning one or more mental models.

Because the process of building pedagogical programs is iterative, the AI engine in training mode can also provide incremental training. That is to say, if the pedagogical programming language code is altered with respect to a concept that comes after other concepts that have already been trained, those antecedent concepts do not need to be retrained.

Additionally, in training mode, the user is able to specify what constitutes satisfactory training should the program itself permit indefinite training.

Algorithm Selection

A first step an AI engine can take is to pick an appropriate learning algorithm to train a mental model. This is a notable step in training AI, and it is a step those without AI expertise cannot perform without expert guidance. The AI engine can have knowledge of many of the available learning algorithms, as well as a set of heuristics for picking an appropriate algorithm including an initial configuration to train from.

The process of picking an appropriate algorithm, etc., can be performed by an AI model that has been trained (and will continue to be trained) by the AI engine, meaning the AI model will get better at building AI models each time a new one is built. A trained AI-engine neural network, such as an AI model, thereby provides enabling AI for proposing neural networks from assembly code and picking appropriate learning algorithms from a number of machine learning algorithms in one or more databases for training the neural networks. The AI engine can be configured to continuously train the trained AI-engine neural network in providing the enabling AI for proposing the neural networks and picking the appropriate learning algorithms thereby getting better at building AI models.

The architect module 326 can also use heuristics, mental model signatures, statistical distribution inference, and Meta-learning in topology and algorithm selection.

First, the AI engine and the architect module 326 thereof can be configured to heuristically pick an appropriate learning algorithm from a number of machine learning algorithms in one or more databases for training the neural network proposed by the architect module 326. Many heuristics regarding the mental model can be used to inform what types of AI and machine learning algorithms can be used. For example, the data types used have a large influence. For this reason, the pedagogical programming language contains rich native data types in addition to the basic data types. If the architect module 326 sees, for example, that an image is being used, a convolutional deep learning neural network architecture might be appropriate. If the architect module 326 sees data that is temporal in nature (e.g., audio data, sequence data, etc.), then a recursive deep-learning neural network architecture like a long short-term memory ("LSTM") network might be more appropriate. The collection of heuristics can be generated by data science and machine learning/AI experts who work on the architect module 326 codebase, and who attempt to capture the heuristics that they themselves use in practice.

In addition to looking at the mental model, the architect module 326 can also consider the pedagogy provided in the pedagogical programming language code. It can, for example, look at the statistical distribution of any data sets being used; and, in the case of simulators, it can ask the simulator to generate substantial amounts of data so as to determine the statistics of data that will be used during training. These distribution properties can further inform the heuristics used.

Meta-Learning

Meta-learning is an advanced technique used by the architect module 326. It is, as the name implies, learning about learning. What this means is that as the architect module 326 can generate candidate algorithm choices and topologies for training, it can record this data along with the signature for the model and the resultant system performance. This data set can then be used in its own learning system. Thus, the architect module 326, by virtue of proposing, exploring, and optimizing learning models, can observe what works and what does not, and use that to learn what models it should try in the future when it sees similar signatures.

To effect meta-learning, the AI engine can include a meta-learning module configured to keep a record such as a meta-learning record in one or more databases. The record can include i) the source code processed by the AI engine, ii) mental models of the source code and/or signatures thereof, iii) the training data used for training the neural networks, iv) the trained AI models, v) how quickly the trained AI models were trained to a sufficient level of accuracy, and vi) how accurate the trained AI models became in making predictions on the training data.

For advanced users, low-level details of a learning topology can be explicitly specified completely or in part. The architect module 326 can treat any such pinning of parameters as an override on its default behavior. In this way, specific algorithms can be provided, or a generated model can be pinned for manual refinement.

Guiding Training

The first step the AI engine will take is to pick an appropriate learning algorithm to train the Mental Model. This is a critical step in training AI. The AI engine has knowledge of many of the available learning algorithms and has a set of heuristics for picking an appropriate algorithm as well as an initial configuration to train from.

Once an algorithm is chosen, the AI engine will proceed with training the AI model's Mental Model via the Curricula. The AI engine manages all of the data streaming, data storage, efficient allocation of hardware resources, choosing when to train each concept, how much (or little) to train a concept given its relevance within the Mental Model (i.e. dealing with the common problems of overfitting and underfitting), and generally is responsible for producing a trained AI model based on the given Mental Model and Curricula. As is the case with picking an appropriate learning algorithm, guiding training—notably avoiding overfitting and underfitting—to produce an accurate AI solution is a task that requires knowledge and experience in training AIs. The AI engine has an encoded set of heuristics manage this without user involvement. Similarly, the process of guiding training is also a trained AI model that will only get smarter with each trained AI model it trains. The AI engine is thus configured to make determinations regarding i) when to train the AI model on each of the one or more concepts and ii) how extensively to train the AI model on each of the one or more concepts. Such determinations can be based on the relevance of each of one or more concepts in one or more predictions of a trained AI model based upon training data.

The AI engine can also determine when to train each concept, how much (or little) to train each concept based on its relevance, and, ultimately, produce a trained AI model. Furthermore, the AI engine can utilize meta-learning. In meta-learning, the AI engine keeps a record of each program it has seen, the data it used for training, and the generated AIs that it made. It also records how fast those AIs trained and how accurate they became. The AI engine learns over that dataset.

Note, when training of an AI object occurs, the hyper learner module 328 can be configured to save into the AI database 341 two versions of an AI object. A first version of an AI object is a collapsed tensile flow representation of the AI object. A second version of an AI object is the representation left in its nominal non-collapsed state. When the search engine retrieves the AI object in its nominal non-collapsed state, then another programmer desiring to reuse the AI object will be able to obtain outputs from the non-collapsed graph of nodes with all of its rich meta-data rather and then a collapsed concept with a single discrete output. The state of the AI data objects can be in a non-collapsed state so the trained AI object has its full rich data set, which then may be used by the user for reuse, reconfigured, or recomposed into a subsequent trained AI model.

The database management system also indexes and tracks different AI objects with an indication of what version is this AI object. Later versions of an AI object may be better trained for particular task but earlier versions of the AI object maybe more generally trained; and thus, reusable for wider range of related tasks, to then be further trained for that specific task.

The AI database 341 and other components in the AI engine cooperate to allow migrations of learned state to reconfigure a trained AI object. When a system has undergone substantial training achieving a learned state, and a subsequent change to the underlying mental models might necessitate retraining, it could be desirable to migrate the learned state rather than starting training from scratch. The AI engine can be configured to afford transitioning capabilities such that previously learned high dimensional representations can be migrated to appropriate, new, high dimensional representations. This can be achieved in a neural network by, for example, expanding the width of an input layer to account for alterations with zero-weight connections to downstream layers. The system can then artificially diminish the weights on connections from the input that are to be pruned until they hit zero and can then be fully pruned.

Deploy and Use

Once a trained AI model has been sufficiently trained, it can be deployed such that it can be used in a production application. The interface for using a deployed trained AI model is simple: the user submits data (of the same type as the trained AI model was trained with) to a trained AI model-server API and receives the trained AI model's evaluation of that data.

As a practical example of how to use a deployed trained AI model, a trained AI model can first be trained to recognize hand-written digits from the Mixed National Institute of Standards and Technology ("MNIST") dataset. An image can be created containing a handwritten digit, perhaps directly through a touch-based interface or indirectly by scanning a piece of paper with the handwritten digit written on it. The image can then be down sampled to a resolution of 28×28 and converted to grayscale, as this is the input schema used to train the example trained AI model. When submitted to the trained AI model-server through the trained AI model server API, the trained AI model can take the image as input and output a one-dimensional array of length 10 (whereby each array item represents the probability, as judged by the trained AI model, that the image is a digit corresponding to the index). The array could be the value returned to the user from the API, which the user could use as needed.

Though a linear approach to building a trained AI model is presented in an embodiment, an author-train-deploy workflow does not have to be treated as a waterfall process. If the user decides further refinement of a trained AI model is needed, be it through additional training with existing data, additional training with new, supplemental data, or additional training with a modified version of the mental model or curricula used for training, the AI engine is configured to support versioning of AI models so that the user can preserve (and possibly revert to) the current state of an AI model while refining the trained state of the AI model until a new, more satisfactory state is reached.

Command Line Interface ("CLI")

The CLI is a tool configured to enables users to configure the AI engine. The CLI is especially useful for automation and connection to other tools. Some actions can only be performed using the CLI. Some actions that can be performed using the CLI include loading a pedagogical programming language file and connecting a simulator.

Web Site

The web site is configured as a browser-based tool for configuring and analyzing AI models stored in the AI engine. The website can be used for sharing, collaborating, and learning. Some information that can be accessed from the web site is a visualization of an AI model's training progress.

Network

FIG. 5A provides a schematic illustrating one or more networks in accordance with an embodiment of the AI system 700A, 700B, or 700C described in reference to FIG. 1A-1C. In an embodiment, the AI system can be a hybrid AI system 700C between one or more computing platforms located on-premises as shown in FIG. 5A (see "Local Private LAN," which includes server 204-S) and one or more cloud-based computing platforms connected over the Internet 202 as further shown in FIG. 5A (see "Bonsai Cloud Platform," which includes server 204-1). In addition, the hybrid configuration or hybrid platform can include a remote site as shown in FIG. 5A (see "remote site #2"). Such a remote site can be accessible to the on-premises installation of the AI engine through a private network 200 or directly or indirectly through the Internet 202.

The multiple independent processes configured to load and execute on the one or more computing platforms of an on-premises installation, which platforms are all connected by a LAN in an AI system such as the AI system 700B of FIG. 1A, are configured such that none of the multiple independent processes send commands for training an AI model to be executed by a cloud-based platform or training data for a simulation over the Internet to be stored on the cloud-based platform.

The multiple independent processes configured to cooperate in a hybrid scenario or hybrid configuration such as the AI system 700C between the one or more computing platforms located on-premises and a cloud-based computing platform connected over the Internet are also loaded and executed on the one or more computing platforms located on-premises. The one or more computing platforms are also connected by a LAN; however, the multiple independent processes are further configured to send some commands for training the AI model to be executed by the cloud-based computing platform and other commands for training the AI model to the cloud-based computing platform connected over the Internet. As such, the one or more computing platforms connected by the LAN and the cloud-based computing platform form a hybrid cloud-based platform with orchestration between the one or more computing platforms located on-premises connected by the LAN and the cloud-based computing platform connected over the Internet. The one or more computing platforms connected by the LAN include edge devices and AI-specific hardware for security and privacy.

FIG. 5B illustrates a number of electronic systems and devices communicating with each other in a network environment in accordance with an embodiment. Each of these network devices may implement one or more AI models, which are i) undergoing training, ii) deployed and predicting, and/or iii) being fine-tuned. The network environment 800 has a communications network 820. The network 820 can include one or more networks selected from an optical network, a cellular network, the Internet, a Local Area Network ("LAN"), a Wide Area Network ("WAN"), a satellite network, a fiber network, a cable network, and combinations thereof. In an embodiment, the communications network 820 is the Internet. As shown, there may be many server computing systems and many client computing systems connected to each other via the communications network 820. However, it should be appreciated that, for example, a single client computing system can also be connected to a single server computing system. As such, FIG. 5B illustrates any combination of server computing systems and client computing systems connected to each other via the communications network 820.

The communications network 820 can connect one or more server computing systems selected from at least a first server computing system 804A and a second server computing system 804B to each other and to at least one or more client computing systems as well. The server computing system 804A can be, for example, the one or more server systems 220 of FIG. 1A, 1B, 2, 5, etc. The server computing systems 804A and 804B can each optionally include organized data structures such as databases 806A and 806B. Each of the one or more server computing systems can have one or more virtual server computing systems, and multiple virtual server computing systems can be implemented by design. Each of the one or more server computing systems can have one or more firewalls to protect data integrity.

Each of the client computing systems may implement one or more AI models, which are i) undergoing training, ii) deployed and predicting, and/or iii) being fine-tuned. The at least one or more client computing systems can be selected from a first mobile computing device 802A (e.g., smartphone with an Android-based operating system), a second mobile computing device 802E (e.g., smartphone with an iOS-based operating system), a first wearable electronic device 802C (e.g., a smartwatch), a first portable computer 802B (e.g., laptop computer), a third mobile computing device or second portable computer 802F (e.g., tablet with an Android- or iOS-based operating system), a smart device or system incorporated into a first smart automobile 802D, a smart device or system incorporated into a first smart bicycle 802G, a first smart television 802H, a first virtual reality or augmented reality headset 804C, and the like. The client computing system 802B can be, for example, one of the one or more client systems 210, and any one or more of the other client computing systems (e.g., 802A, 802C, 802D, 802E, 802F, 802G, 802H, and/or 804C) can include, for example, the software application or the hardware-based system in which the trained AI model can be deployed. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer 802B (e.g., the client computing system) and the server computing system 804A can both initiate and respond to communications, their communications can be viewed as peer-to-peer. Additionally, the server computing systems 804A and 804B include circuitry and software enabling communication with each other across the network 820.

Any one or more of the server computing systems can be a cloud provider. A cloud provider can install and operate application software in a cloud (e.g., the network 820 such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

Computing Systems

FIG. 6 illustrates a computing system 900 that can be, wholly or partially, part of one or more of the server or client computing devices making up the one or more computing platforms in accordance with an embodiment. With reference to FIG. 6, components of the computing system 900 can include, but are not limited to, a processing unit 920 having one or more processing cores, a system memory 930, and a system bus 921 that couples various system components including the system memory 930 to the processing unit 920. The system bus 921 may be any of several types of bus structures selected from a memory bus or memory controller, a peripheral bus, and a local bus using any of a variety of bus architectures.

Computing system 900 typically includes a variety of computing machine-readable media. Computing machine-readable media can be any available media that can be accessed by computing system 900 and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media. As an example, some client computing systems on the network 920 of FIG. 6 might not have optical or magnetic storage.

The system memory 930 includes computer storage media in the form of volatile and/or nonvolatile memory such as read only memory (ROM) 931 and random access memory (RAM) 932. A basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, FIG. 6 illustrates that RAM 932 can include a portion of the operating system 934, application programs 935, other executable software 936, and program data 937.

The drives and their associated computer storage media discussed above and illustrated in FIG. 6, provide storage of computer readable instructions, data structures, other executable software and other data for the computing system 900. In FIG. 6, for example, the solid state memory 941 is illustrated for storing operating system 944, application programs 945, other executable software 946, and program data 947. Note that these components can either be the same as or different from operating system 934, application programs 935, other executable software 936, and program data 937. Operating system 944, application programs 945, other executable software 946, and program data 947 are given different numbers here to illustrate that, at a minimum, they are different copies.

A user may enter commands and information into the computing system 900 through input devices such as a keyboard, touchscreen, or software or hardware input buttons 962, a microphone 963, a pointing device and/or scrolling input component, such as a mouse, trackball or touch pad. The microphone 963 can cooperate with speech recognition software. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a hand-held device, a server, a router, a network PC, a peer device or other common network node, and typically includes many or all of the elements described above relative to the computing system 900. The logical connections depicted in FIG. 6 can include a personal area network ("PAN") 972 (e.g., Bluetooth®), a local area network ("LAN") 971 (e.g., Wi-Fi), and a wide area network ("WAN") 973 (e.g., cellular network), but may also include other networks. Such networking environments are commonplace in offices, enterprise-wide computer networks, intranets and the Internet. A browser application may be resident on the computing device and stored in the memory.

When used in a LAN networking environment, the computing system 900 is connected to the LAN 971 through a network interface or adapter 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in the remote memory storage device. By way of example, and not limitation, FIG. 6 illustrates remote application programs 985 as residing on remote computing device 980. It will be appreciated that the network connections shown are examples and other means of establishing a communications link between the computing devices may be used.

It should be noted that the present design can be carried out on a computing system such as that described with respect to FIG. 6. However, the present design can be carried out on a server, a computing device devoted to message handling, or on a distributed system in which different portions of the present design are carried out on different parts of the distributed computing system.

In an embodiment, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

Flow Diagram

FIGS. 7A and 7B provide a flow diagram illustrating a method of installing multiple independent processes, training the AI model, and deployment of the AI model in accordance with an embodiment. As shown, the method 700 includes a number of steps for installing the multiple independent processes. Note, the following steps may be performed in any order where logically possible.

In step 710, the method 700 includes installing multiple independent processes, each wrapped in its own container, onto one or more computing platforms, where the one or more computing platforms are located on-premises of a user's organization. In step 715, a determination is made to download and install a full set of the containerized multiple independent processes, each wrapped in its own container or a light set of the multiple independent processes that has a reduced lower amount than the full set. The full set of the containerized multiple independent processes, each wrapped in its own container, has been generated for download for a generic standard installation on the one or more computing platforms. However, a light set of the multiple independent processes that has a reduced lower amount than the full set has also been generated for download and installation based on an organization's particular needs. The light set of the multiple independent processes provides a base set of functionality, and then allows customization of additional independent processes for the installation based on particular needs of that user's organization and amount of available computing platforms to create and train the one or more AI models. A user interface provides a service to allow the user's organization to choose to install either the full set of the multiple independent processes or the light set of the multiple independent processes.

Note, depending on what type of AI model is being trained, all of the multiple independent processes may not be needed. For example, a subset of the full set of the containerized independent processes can be used in a limited installation, such as an AI model for a robot in need of, at most, fine tuning of its training from its initial training of this AI model and/or a device with a fully trained AI model that merely needs to be deployed for making predictions. The containers of the independent processes can be coded to run on different hardware processors and operating systems found on-premises. For example, a first instance of a first container can be coded to run on a first type of processor such as an INTEL™ x86 processors and a second instance of a first container is coded to run on a second type of processor such as an IBM™ POWER8™ processors. Also, the first container may be coded to with a first type of operating system and the second container may be coded to with second type of operating system. Such an on-premises installation of the different processes of the AI engine may occur using a Salt SALTSTACK™ or other similar container as well as the system can be adapted to different configurations of hardware on the customer's premises.

In a second step 720, the method 700 includes determining a number of i) virtual machines, ii) physical machines, or iii) both physical and virtual machines available in a cluster of the one or more computing platforms located on-premises for creating and training one or more AI models with the one or more computing platforms.

In a third step 730, the method 700 includes allocating network addresses to the machines and copying scripts to the machines for the multiple independent processes.

In a fourth step 740, the method 700 includes running a first script configured to install the multiple independent processes on the machines for the multiple independent processes.

The set of independent processes, each independent process wrapped in its own software container, at least includes an instructor process and a learner process. The instructor process is configured to carry out a training plan codified in a pedagogical software programming language, and the learner process is configured to carry out an actual execution of underlying AI learning algorithms during a training session. The instructor process and the learner process of the set of independent processes cooperate with one or more data sources to train a new AI model.

An installer script of the multiple independent processes is configured to install on an available hardware architecture of the one or more computing platforms. A service is further configured to direct a first CPU computing device to load and run an architect process, a second CPU computing device to load and run the instructor process, a first GPU computing device to load and run the learner process, and assign roles of those processes to run on the available hardware architecture of the one or more computing platforms.

In a fifth step 750, the method 700 includes allocating one or more roles to every machine or node thereof in the cluster, the roles for constraining particular independent process to certain types of nodes. Allocating the one or more roles to every machine or node thereof in the cluster includes designating one server as a master and any other servers as minions of the master.

The method 700 can further include a containerized software daemon on a first computing machine, of the number of machines, designated as an allocated role of a master and a containerized software daemon on each of a subsequent number of computing machines in the cluster as designated as an allocated role of minions. Before bootstrapping the minions, each minion is allocated the one or more roles.

In step 760, multiple simulators may cooperate with the on-premises installation and/or hybrid installation of the multiple independent processes. For example, a first simulator may cooperate with the instructor process and the learner process to conduct a first simulation and send a first set of training data for the new AI model, in parallel with, a second simulator cooperating with the instructor process and the learner process to conduct a second simulation and sending a second set of training data for the new AI model. Note, in an embodiment, at least the first simulator is also located on the premises of the user's organization.

The installation may all be located on the on the premises of the user's organization. All of the multiple independent processes are loaded and executed on the one or more computing platforms, which are all connected by a LAN, and where the multiple independent processes are configured such that none of the multiple independent processes send commands for training for a first AI model to be executed by a cloud-based platform or send training data for a simulation over the Internet to be stored on the cloud based platform.

The installation may be a hybrid. A cloud-based platform with some of the multiple independent processes cooperates with an orchestration between the one or more computing platforms with some of the multiple independent processes located on-premises connected by the LAN and the cloud-based computing platform connected over the Internet.

In step 770, training is conducted on one or more AI models with the multiple independent processes and the data sources such as simulators, data generators, and/or databases of information. Note, installing the multiple independent processes, each wrapped in its own container, onto one or more computing platforms located on-premises of the user's organization improves a lag time and amount of computing cycles for a subsequent training of the AI models compared to a simulator located on-premises and training with a cloud based only computing platform. This generally also extends to the hybrid configuration as well.

In step 780, after the training is complete, the new AI model is then deployed and used for doing predictions on data from a data source. This data source may be a video game, robotic implementations, additional simulations, etc. just to name a few. After the initial training, fine tuning may occur to further refine the training of the AI model prior to its eventual deployment for use.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
an Artificial Intelligence ("AI") engine having multiple independent processes on one or more computing platforms,
where the AI engine has a user interface for one or more users in a user's organization,
where the multiple independent processes are configured to have their instructions executed by one or more processors in the one or more computing platforms, and the multiple independent processes are configured to be loaded into one or more memories of the one or more computing platforms,
where the one or more computing platforms are located on-premises of the user's organization which means
 i) the one or more computing platforms are configurable for the one or more users in the user's organization to have at least administrative rights over the one or more computing platforms in order to configure hardware components of the one or more computing platforms to operate how the user's organization chooses to fit their needs to execute and load the multiple independent processes,
 ii) where the one or more users of the user's organization are able to physically access the one or more computing platforms, and
 iii) where the hardware components of the one or more computing platforms are connected to each other through a Local Area Network (LAN) and the LAN is configurable such that the one or more users in the user's organization have a right to control an operation of the LAN; where the multiple independent processes are configured as a set of independent processes, each independent process thereof wrapped in its own software container so that multiple instances of a same independent process can run simultaneously to scale to handle actions selected from a group consisting of
  1) running multiple training sessions on two or more AI models at a same time,
  2) creating the two or more AI models at the same time,
  3) running a first training session on one or more of AI models while creating the one or more AI models at the same time, and
  4) any combination of these three, on the same AI engine, where a first service of the multiple independent processes is configured to handle scaling by dynamically calling in additional computing devices to load on and run additional instances of each independent process wrapped in its own container as needed, where the multiple independent processes improve an efficiency of the one or more computing platforms hosting the AI engine located on-premises of the user's organization by scaling over an amount of available computing platforms,
 wherein an installer script of the multiple independent processes is configured to install on an available hardware architecture of the one or more computing platforms, where the first service is further configured to direct a first CPU computing device to load and run an architect process, a second CPU computing device to load and run an instructor process, a first GPU computing device to load and run a learner process, and assign roles of those processes to run on the available hardware architecture of the one or more computing platforms.

2. The apparatus of claim 1, wherein the set of independent processes, each independent process wrapped in its own software container, at least includes the instructor process and the learner process, where the instructor process is configured to carry out a training plan codified in a pedagogical software programming language, and the learner process is configured to carry out an actual execution of underlying AI learning algorithms during a training session, where the instructor process and the learner process of the set of independent processes cooperate with one or more data sources to train a new AI model.

3. The apparatus of claim 1, wherein a first instance of the multiple independent processes wrapped in its own software container is configured to allow each instance of that independent process to run independently on whatever computing device that instance is running on, and where the first service is configured to dynamically change an amount of computing devices over time running the multiple independent processes and to rapidly scale to handle multiple users sending multiple AI models to be trained, and wherein a second service is configured to cause a first instance of the instructor process to be instantiated, loaded onto a CPU computing device, and then run on the CPU of the computing device.

4. The apparatus of claim 1, wherein the multiple independent processes carry out four or more separate tasks by interaction with and cooperation between the multiple independent processes, where at least
 i) a first task is creating a shell of an AI model,
 ii) a second task is loading in a file of scripted code in a programming language to help define a topology of processing nodes in the AI model, a layout of concepts making up the AI model, and a selection of an appropriate learning algorithm for the AI model,
 iii) a third task is starting to train the AI model with a data source, and
 iv) a fourth task is then deploying and using a trained AI model and doing predictions on data from the data source.

5. The apparatus of claim 1, wherein all of the multiple independent processes are loaded and executed on the one or more computing platforms, which are all connected by the LAN, and where the multiple independent processes are configured such that none of the multiple independent processes send commands for training a first AI model to be executed by a cloud-based platform or send training data for a simulation over the Internet to be stored on the cloud based platform.

6. The apparatus of claim 1, wherein the multiple independent processes are configured to cooperate in a hybrid scenario between a first set of the one or more computing platforms located on-premises and a second set of the one or more computing platforms located on a cloud-based computing platform connected over the Internet, where the multiple independent processes are loaded and executed on the one or more computing platforms located on-premises, which are all connected by the LAN, and where the multiple independent processes are configured to send some commands for training the AI model over the Internet to be executed by the second set of the one or more computing platforms located on cloud-based computing platform.

7. The apparatus of claim 6, wherein the one or more computing platforms connected by the LAN and the cloud-based computing platform form a hybrid cloud-based platform with an orchestration between the one or more computing platforms located on-premises connected by the LAN and the cloud-based computing platform connected over the Internet, where the one or more computing platforms connected by the LAN include edge devices and AI-specific hardware for security and privacy.

8. A method of installing multiple independent processes, each wrapped in its own container, onto one or more computing platforms, where the one or more computing platforms are located on-premises of a user's organization, comprising:
   determining a number of i) virtual machines, ii) physical machines, or iii) both physical and virtual machines available in a cluster of the one or more computing platforms located on-premises for creating and training one or more Artificial Intelligence ("AI") models with the one or more computing platforms;
   allocating network addresses to the number of machines and copying scripts to the machines for the multiple independent processes;
   running a first script configured to install the multiple independent processes on the machines for the multiple independent processes; and
   allocating one or more roles to every machine or node thereof in the cluster, the roles for constraining particular independent processes to certain types of nodes,
   where installing the multiple independent processes, each wrapped in its own container, onto one or more computing platforms located on-premises of the user's organization improves a lag time and amount of computing cycles for a subsequent training of the AI models compared to a simulator located on-premises and training with a cloud based only computing platform,
   wherein a set of independent processes, each independent process wrapped in its own software container, at least includes a first process, where the first process is configured to carry out a training plan codified in a pedagogical software programming language, and configured to carry out an actual execution of underlying AI learning algorithms during a training session, where the first process of the set of independent processes cooperate with one or more data sources to train a new AI model,
   wherein an installer script of the multiple independent processes is configured to install on an available hardware architecture of the one or more computing platforms, where a first service is further configured to direct a first CPU computing device to load and run an architect process, a first GPU computing device to load and run the first process, and assign roles of those processes to run on the available hardware architecture of the one or more computing platforms,
   where any software implemented in the multiple independent processes is stored in one or more non-transitory machine-readable mediums in an executable format, which can be executed by one or more processors in the one or more computing platforms located on the premises of the user's organization.

9. The method of claim 8, further comprising:
   generating a full set of the multiple independent processes, each wrapped in its own container, for a generic set up on the one or more computing platforms;
   generating a light set of the multiple independent processes that has a reduced lower amount than the full set, which provides a base set of functionality, and then allowing customization of additional independent processes for the installation based on particular needs of that user's organization and amount of available computing platforms to create and train the one or more AI models; and providing a service to allow the user's organization to choose to install either the full set of the multiple independent processes or the light set of the multiple independent processes.

10. The method of claim 8, further comprising:
    using a full set of the multiple independent processes in a standard installation and using a subset of the full set of the containerized independent processes in a limited installation; and
    coding the containers to run on different hardware processors found on-premises including INTEL™ x86 processors and IBM™ POWER8™ processors, as well as different operating systems.

11. The method of claim 10, wherein the limited installation is installation on a robot in need of fine tuning of its training from its initial training of this AI model.

12. The method of claim 10, wherein the limited installation is installation on a device with a fully trained AI model that merely needs to be deployed for making predictions.

13. The method of claim 8, wherein the allocating roles to every machine or node thereof in the cluster includes designating one server as a master and any other servers as minions of the master.

14. The method of claim 13, further comprising:
    bootstrapping a containerized software daemon on a first computing machine, of the number of machines, designated as an allocated role of a master and a containerized software daemon on each of a subsequent number of computing machines in the cluster as designated as an allocated role of minions, wherein before bootstrapping the minions, each minion is allocated the one or more roles.

15. The method of claim 8, wherein a first simulator cooperates with the first process to conduct a first simulation and send a first set of training data for the new AI model, in parallel with, a second simulator cooperating with the first process to conduct a second simulation and sending a second set of training data for the new AI model, where at least the first simulator is also located on-premises of the user's organization, where having the simulator located on-premises and the processes of the AI engine located on-premises that improves a lag time between an exchange of information between the simulator and the AI engine compare to the AI engine being located remotely.

16. The method of claim 15, wherein the new AI model is then deployed and used for doing predictions on data from a data source.

17. The method of claim 8, wherein all of the multiple independent processes are loaded and executed on the one or more computing platforms, which are all connected by a LAN, and where the multiple independent processes are configured such that none of the multiple independent processes send commands for training for a first AI model to be executed by a cloud-based platform or send training data for a simulation over the Internet to be stored on the cloud based platform.

* * * * *